US011605981B2

(12) United States Patent
Spinella

(10) Patent No.: US 11,605,981 B2
(45) Date of Patent: Mar. 14, 2023

(54) SYSTEM FOR THE WIRELESS TRANSFER OF ELECTRICAL POWER

(71) Applicant: EGGTRONIC ENGINEERING S.P.A., Modena (IT)

(72) Inventor: Igor Spinella, Modena (IT)

(73) Assignee: EGGTRONIC ENGINEERING S.P.A., Modena (IT)

(*) Notice: Subject to any disclaimer, the term of this patent is extended or adjusted under 35 U.S.C. 154(b) by 0 days.

(21) Appl. No.: 17/348,445

(22) Filed: Jun. 15, 2021

(65) Prior Publication Data

US 2021/0313838 A1 Oct. 7, 2021

Related U.S. Application Data

(63) Continuation of application No. 16/472,665, filed as application No. PCT/IB2017/056524 on Oct. 20, 2017, now abandoned.

(30) Foreign Application Priority Data

Dec. 22, 2016 (IT) .................. 102016000130208

(51) Int. Cl.
*H02J 50/12* (2016.01)
*H02J 50/90* (2016.01)
*H02J 50/40* (2016.01)
(52) U.S. Cl.
CPC ............ *H02J 50/12* (2016.02); *H02J 50/402* (2020.01); *H02J 50/90* (2016.02)

(58) Field of Classification Search
CPC .................................. H02J 50/00; H04B 5/00
See application file for complete search history.

(56) References Cited

U.S. PATENT DOCUMENTS 4,245,285 A    1/1981  Weiss
4,304,184 A *  12/1981 Jones .................. F42B 3/18
                                              102/202.13

(Continued)

FOREIGN PATENT DOCUMENTS

JP    2004229406 A    8/2004
JP    2009252970 A    10/2009

(Continued)

*Primary Examiner* — Adi Amrany
(74) *Attorney, Agent, or Firm* — Browdy and Neimark, PLLC

(57) ABSTRACT

An injection device for delivering equal doses of a fluid contained in a reservoir, the device having a housing, and an arming mechanism and a dose delivery mechanism arranged therein, the housing coupled to an enclosure for the reservoir. The arming mechanism includes an axially non-displaceable and rotatable setting sleeve. The setting sleeve is coupled with a spring strained by the rotation of the setting sleeve during arming of the device. The dose delivery mechanism includes a screw ring and a non-rotatable and axially displaceable piston rod within the setting sleeve. The piston rod cooperates with the screw ring so that during arming, the screw ring and the piston rod are immobilized, and during delivery of each dose the piston rod is displaced along the housing due to unwinding of the spring and rotation of the screw ring, the displacement of the piston rod causing the fluid to be discharged from the reservoir.

9 Claims, 21 Drawing Sheets

(56) References Cited

U.S. PATENT DOCUMENTS

| | | | | |
|---|---|---|---|---|
| 5,990,826 A * | 11/1999 | Mitchell | | G01S 1/042 342/386 |
| 6,531,985 B1 * | 3/2003 | Jones | | G06F 1/1616 343/702 |
| 8,228,027 B2 * | 7/2012 | Gao | | H02J 50/402 320/108 |
| 8,907,526 B2 | 12/2014 | Harakawa | | |
| 9,906,068 B2 | 2/2018 | Spinella | | |
| 2002/0093335 A1 * | 7/2002 | Miller | | G01R 33/441 324/309 |
| 2005/0120316 A1 * | 6/2005 | Suaya | | G06F 30/367 716/136 |
| 2008/0272737 A1 * | 11/2008 | Robertsson | | H02J 7/025 320/128 |
| 2008/0309452 A1 * | 12/2008 | Zeine | | H02J 50/23 340/5.1 |
| 2009/0072782 A1 | 3/2009 | Randall | | |
| 2009/0096413 A1 | 4/2009 | Partovi et al. | | |
| 2009/0111531 A1 * | 4/2009 | Cui | | H04M 1/0208 455/572 |
| 2009/0134953 A1 * | 5/2009 | Hunt | | H01P 1/184 333/168 |
| 2010/0163295 A1 * | 7/2010 | Roy | | H01L 21/50 174/262 |
| 2011/0127953 A1 | 6/2011 | Walley et al. | | |
| 2011/0285210 A1 | 11/2011 | Lemmens et al. | | |
| 2013/0187561 A1 | 7/2013 | Franck et al. | | |
| 2014/0009108 A1 * | 1/2014 | Leabman | | H02J 7/00 307/149 |
| 2014/0139034 A1 | 5/2014 | Sankar et al. | | |
| 2014/0146902 A1 * | 5/2014 | Liu | | H04B 7/0413 375/260 |
| 2014/0159500 A1 | 6/2014 | Sankar et al. | | |
| 2015/0236526 A1 | 8/2015 | Jadidian | | |
| 2015/0318730 A1 | 11/2015 | Bhargava | | |
| 2016/0043575 A1 | 2/2016 | Ichikawa | | |
| 2016/0099578 A1 | 4/2016 | Hosung | | |
| 2016/0226299 A1 | 8/2016 | Nam et al. | | |
| 2016/0336813 A1 * | 11/2016 | Yeh | | H02J 7/025 |
| 2018/0241218 A1 | 8/2018 | Spinella | | |
| 2019/0190324 A1 | 6/2019 | Bassetti et al. | | |
| 2019/0363586 A1 | 11/2019 | Spinella et al. | | |
| 2019/0372399 A1 * | 12/2019 | Park | | H01Q 3/30 |

FOREIGN PATENT DOCUMENTS

| | | |
|---|---|---|
| JP | 2012019302 A | 1/2012 |
| WO | 2015198123 A1 | 12/2015 |

\* cited by examiner

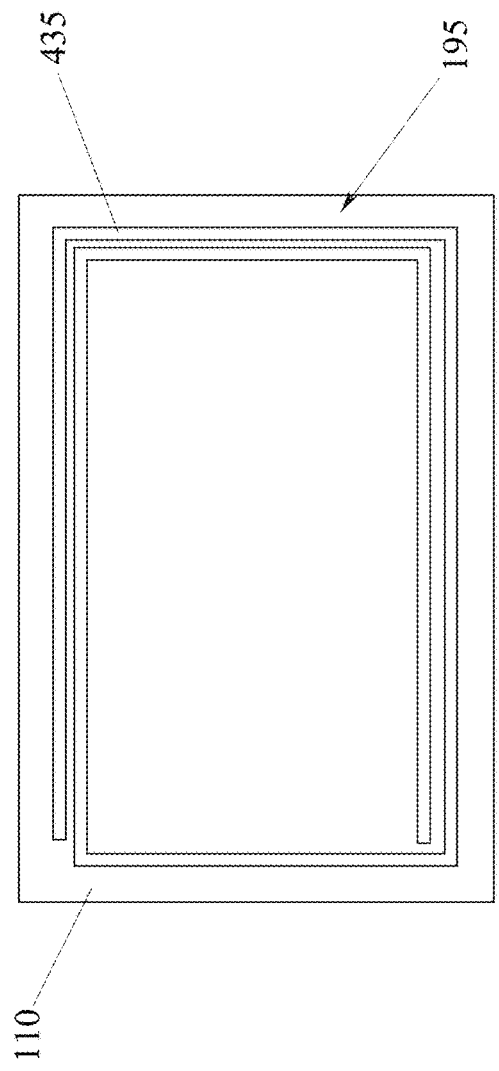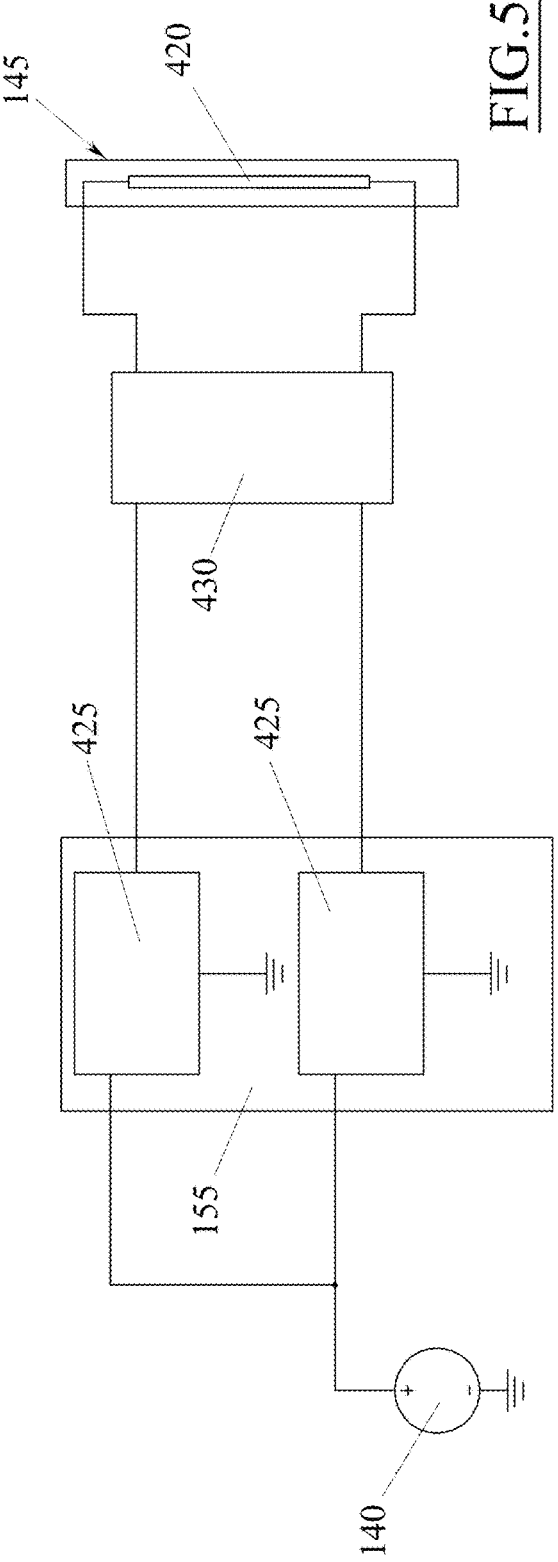

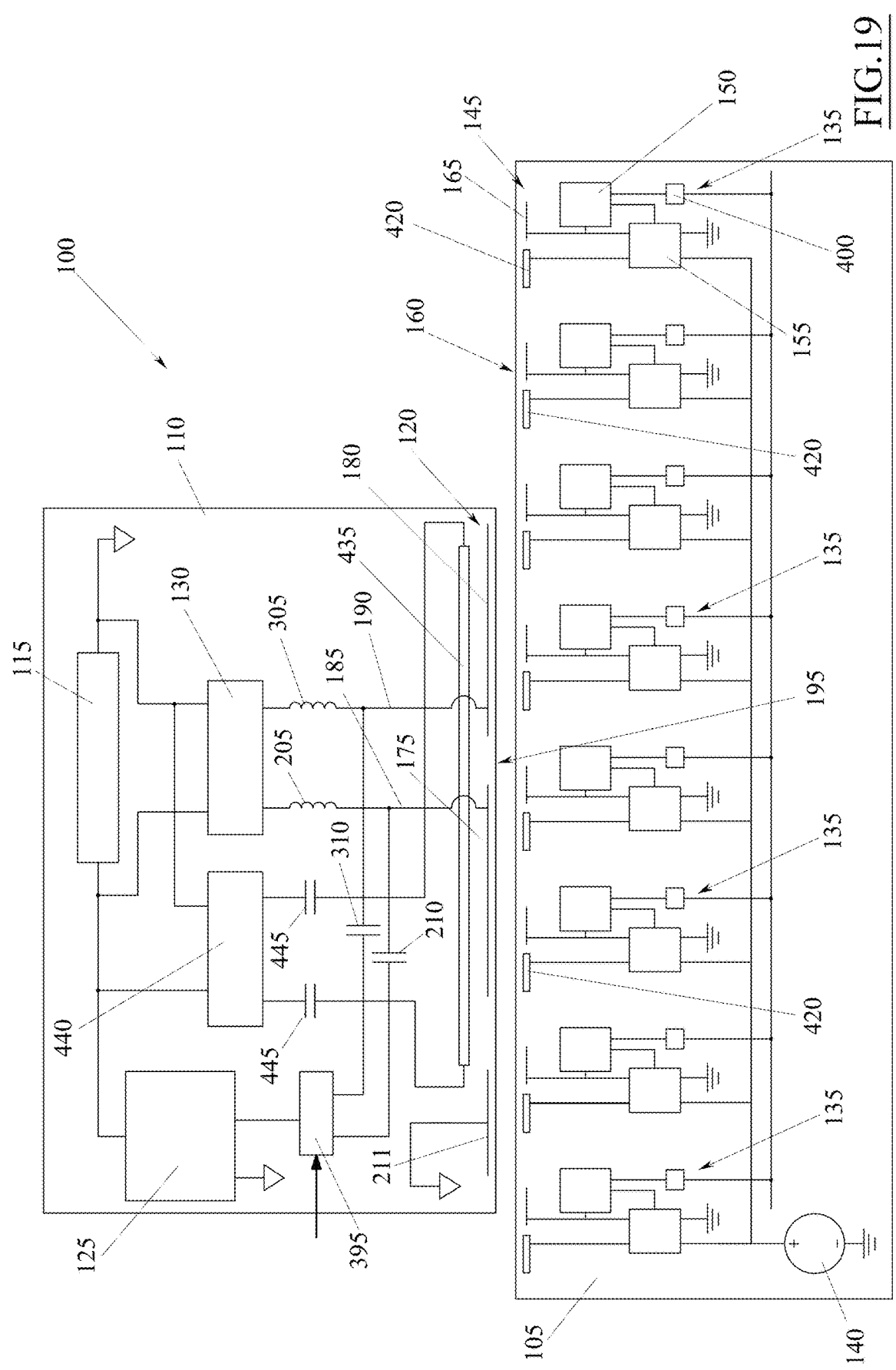

SYSTEM FOR THE WIRELESS TRANSFER OF ELECTRICAL POWER

TECHNICAL FIELD

The present invention generally relates to a wireless power supply and/or recharging system for one or more electrical loads. Such electrical loads may be, for example, electric/electronic devices that need to be powered electrically to enable them to operate and/or to charge the internal batteries of the device itself. Classic examples of this type of electric/electronic devices are cellular telephones, tablets, computers, television sets, lighting sets, e.g. LED, and many others.

PRIOR ART

Currently known systems to transfer electrical power to a load in wireless mode are generally based on the obtainment of an inductive or capacitive coupling between a receiving apparatus positioned on the device to be powered/recharged and a transmission apparatus positioned on a corresponding power supply device.

Within the systems based on inductive coupling, use is typically made of a transmission antenna positioned on the power supply device, e.g. having the shape of a coil, and a reception antenna positioned on the device to be powered. In this way, even without a galvanic connection between transmission apparatus and reception apparatus, it is possible to power electric and electronic devices of various kinds.

One problem of these short range wireless power supply/recharging system consists of having to position the device to be powered/recharged in a precise position with respect to the related power supply device.

In the case of the inductive systems, this problem can be solved creating transmitting antennas that are able to generate a magnetic induction field in a rather broad region of space (e.g. with bigger coils or with antennas capable of radiating energy in a broad portion of space), but this approach considerably deteriorates the energy efficiency of the system, reduces the transmissible power and increases electromagnetic pollution.

Another solution is to equip the power supply device with a plurality of antennas (coils) having smaller dimensions, each powered by a power circuit that is independent from the others and possibly positioned in such a way as to assure a partial superposition between the magnetic fields generated by them.

However, this solution determines a considerable increase in the costs and bulk of the system and in any case it does not eliminate the low energy efficiency problems that characterize inductive systems.

A purpose of the present invention is to overcome the limits highlighted above and, in particular, to provide a system for the wireless transmission of electrical power able to power devices randomly positioned in proximity to a power supply device, in a more efficient manner and with smaller size than the prior art.

These objects are achieved by the characteristics of the invention set out in the independent claims. The dependent claims outline preferred and/or particularly advantageous aspects of the various embodiments of the invention.

DISCLOSURE OF THE INVENTION

In consideration of the above, the present invention makes available a system for the wireless transfer of electrical power to an electrical load, where said system comprises:

a power supply device and
a device to be powered, physically separate and independent from the power supply device, wherein the device to be powered comprises:
the electrical load to be powered, and
a receiving apparatus connected to the electrical load and comprising at least one inductive receiving element, wherein the power supply device comprises a plurality of electrical power transmission sets, each of which includes:
a transmitting apparatus comprising at least one inductive transmitting element able to achieve an inductive coupling with the inductive receiving element, and
a power circuit able to apply to the transmitting apparatus a voltage wave that is periodically variable over time, and wherein the inductive transmitting elements of the transmission sets individually have planar conformation and are globally positioned side by side on an operating surface of the power supply device in such a way as to form a grid.

Inductive elements with planar conformation are generally understood to be thin bodies of electrically conductive material, e.g. wire segments or strips, which possess a prevalently inductive electrical behavior.

These inductive elements are positioned on the operating surface of the power supply device in such a way as to lie substantially coplanar or otherwise parallel to the operating surface itself.

This means that, if the operating surface is perfectly flat, the inductive elements will extend in one or two dimensions of space only (obviously neglecting thickness), but also that the inductive elements may extend in three dimensions, it the operating surface is curved, e.g. slightly domed or concave.

The inductive elements cannot instead be coils that develop helically in space.

Thanks to this grid of inductive transmitting elements, the size of the power supply device can be kept very small, in particular with regard to its thickness.

At the same time, the grid of inductive transmitting elements makes it always possible, for multiple shapes and dimensions of the inductive receiving elements of the device to be powered, to identify a group of inductive transmitting elements that globally approximates in an efficient manner its shape and dimensions, maximizing coupling with the inductive receiving elements.

Thanks to the presence of numerous independent power circuits, this set of inductive transmitting elements can also be powered selectively, for example leaving unpowered all the other inductive transmitting elements of the power supply device, thereby creating an optimal magnetic induction field for the transfer of electrical power to the device to be powered, improving the global efficiency of the transmission system and reducing dispersions and electromagnetic pollution.

This effect cannot be obtained with the transmitting antennas (helical coils) of the prior art, because each of them creates a magnetic induction field that does not always perfectly concatenate with the receiving antennas of the devices to be powered, especially when the receiving antennas, mounted on different devices to be powered, can have different dimensions, as takes place for example to power a portable computer and a smartphone.

Unlike these known devices, the proposed solution is instead able to adapt dynamically to the devices to be powered, making it possible to efficiently and possibly simultaneously supply power to devices that have inductive receiving elements of any size and shape, e.g. cellular telephones, laptop computers, lamps, television sets and many others.

In this regard, according to an aspect of the invention the system can comprise:
- a monitoring system able to detect a relative position between each transmission set and the device to be powered,
- a selection system able to select, based on the detection made by the monitoring system, an array of transmission sets whose transmitting apparatus is in suitable position to achieve the coupling with the receiving apparatus of the power supply device, and
- a control system able to activate the power circuit of the transmission sets belonging to the selected array.

In this way, the power supply apparatus is able to activate only the transmission sets whose transmitting apparatuses can effectively be coupled with the receiving apparatus of the device to be powered, reducing losses and electromagnetic pollution.

According to another aspect of the present invention, the inductive transmitting elements can individually have elongated form, i.e. they can individually extend in a prevalent direction, e.g. according to a straight or curved line, a polygonal chain or a mixed line.

Thanks to this solution it is possible to create a grid of inductive transmitting elements that is able to better approximate the various shapes and dimensions of the inductive receiving elements of the devices to be powered.

In this regard, in a particularly efficient embodiment the inductive transmitting elements can individually have a prevalently rectilinear development and are not globally aligned by longitudinal rows and by transverse rows, where the transverse rows cross the longitudinal rows defining the aforesaid grid, According to another embodiment of the invention, the transmitting apparatus of each transmission set of the power supply device can also comprise:
- at least one transmitting armature connected to the corresponding power circuit and positioned on the operating surface of the power supply device within a mesh of the grid of inductive transmitting elements, and the receiving apparatus of the device to be powered can also comprise:
- a first receiving armature connected to the electrical load and able to face the transmitting armature of a first transmission set to obtain a first electrical capacitance of a capacitive connection.
- a second receiving armature connected to the electrical load and able to face the transmitting armature of a second transmission set to obtain a second electrical capacitance of a capacitive connection.

In this way, it is advantageously possible to obtain a hybrid inductive and capacitive transmission of electrical power, in which these two technologies can be used alternatively or concurrently to power the load positioned on the device to be powered.

For example, if the distance between the power supply device and the device to be powered is very small (e.g. laptop or cellular telephone bearing directly on the operating surface), the system can preferably exploit the capacitance coupling and possibly exploit the inductive coupling only as an additional power contribution.

Vice versa, the inductive coupling can be advantageous over greater distances.

As distance increases, it may be useful to reconfigure the system dynamically to operate by means of resonating magnetic coupling and, at even greater distances, to serve as a radiating transmission antenna, coupled to one or more receiving antennas, This allows to achieve the transfer of power not only for any position of the device to be powered on the operating surface, but also for various distances in the orthogonal/vertical direction (from a few centimeters to a few meters), changing, also dynamically, the type of preferential coupling between capacitive, inductive, resonating magnetic and/or based on radiating antennas.

It should also be stressed that the transmitting apparatuses, both inductive and capacitive, in particular at a large distance, can be exploited as a multitude of antennas driven at high frequencies, e.g. RF, such as to generate in space constructive and destructive interferences useful for example to reach and possibly to dynamically track target receiving antennas with particularly precise directional beams.

According to another aspect of the invention, the transmitting apparatus of each transmission set of the power supply device can comprise a plurality of transmitting armatures connected to the corresponding power circuit and positioned within the same mesh of the grid of inductive transmitting elements.

Thanks to this solution, it is advantageously possible significantly to increase the number of transmitting armatures, without an excessive increase of the power circuits, thereby maintaining costs under control. This multiplication of the number of transmitting armatures in turn has the advantage of allowing a reduction of the dimensions of each of them, which can therefore be arranged to form a very closely subdivided transmitting surface that allows to obtain a very precise capacitive coupling with the receiving armatures, enabling power transmission substantially for any position of the device to be powered and reducing electromagnetic emissions by virtue of the reduction of the capacitive transmission area not covered by the capacitive reception area.

According to a different aspect of the invention, the receiving apparatus of the device to be powered can comprise two inductive receiving elements able to achieve an inductive coupling with one or more inductive transmitting elements of the power supply device, of which a first inductive receiving element connected in series between the first receiving armature and the electrical load and a second inductive transmitting element connected in series between the second receiving armature and the electrical load.

Thanks to this solution, the inductive receiving elements can serve multiple functions: series inductor able to form a resonator of the power circuit and inductive receiving elements useful to boost the power transmitted to the load, adding the power received inductively to the power received capacitively.

This implementation is thus particularly advantageous inasmuch as it minimizes the number of necessary components, e.g. eliminating rectifiers and resonance inductors, thus reducing the size and the costs of the device to be powered, while increasing the versatility of the system and the transmissible power.

According to another aspect of the invention, the power circuit of each transmission set comprises at least one switching circuit able to receive a driving signal and to connect the transmitting apparatus to a voltage generator in an intermittent and periodic manner, with a frequency equal to the frequency of the driving signal.

Thanks to this solution, it is advantageously possible to generate the voltage wave able to power the load in a relatively simple, rational manner and with rather low cost.

If the transmitting apparatus comprises both transmitting elements of the inductive type (one or more inductive transmitting elements) and transmitting elements of the capacitive type (one or more transmitting armatures), the corresponding power circuit may comprise a plurality of the aforesaid switching circuits, each connected to at least one respective transmitting element (capacitive or inductive) but all controlled with the same driving signal.

To obtain high performance and efficiency in the transfer of electrical power, especially if the system also uses a capacitive coupling, it is preferable for the switching circuit to be able to generate a voltage wave having very high frequency (e.g. in the order of MHz, tens of MHz or hundreds of MHz).

A particularly convenient way to obtain this result consists of using a switching circuit constructed according to totally resonating schemes, wherein the circuit topology and the driving system make it possible to eliminate almost completely the dynamic losses in the switches, thus allowing high switching frequencies and low losses. A category of switching circuits that advantageously achieves these objectives derives from the appropriate modification of class D, E, F or E/F amplifiers.

In this regard, according to one aspect of the present invention the switching circuit can comprise a pair of electrical switches connected in series between the voltage generator and a reference potential, between said switches being included a central node connected to the transmitting apparatus.

In this way, it is advantageously possible to generate the voltage wave simply by alternately turning on and off the two switches at the frequency of the driving signal.

Alternatively, the switching circuit may comprise an inductor (known as choke) and a switch connecting in series between the voltage generator and a reference potential (e.g. a ground), between said inductor and said inductor being included a central node electrically connected to the transmitting apparatus.

Thanks to this solution it is possible to generate the voltage wave using a single switch and hence reducing the costs of the system In both cases, the switches can be active switches. e.g. high performance BJT, IGBT, N-channel MOSFET, P-channel MOSFET. CMOS. FET transistors based on GaN, GaAs, SiC or other switches.

BRIEF DESCRIPTION OF THE DRAWINGS

Additional characteristics and advantages of the invention shall become readily apparent from the description that follows, provided by way of example but without limitation, with the aid of the figures illustrated in the accompanying table.

FIGS. 4, 11 and 23 show bottom plan views of a receiving surface of a device to be powered according to different embodiments of the invention.

FIGS. 5, 8, 15, 20 and 25 show the circuit diagram of an electrical power transmission set according to different embodiments of the present invention.

FIGS. 10, 13, 19, 22 and 24 show different embodiments of the system of FIG. 2.

DETAILED DESCRIPTION

Figure 1:
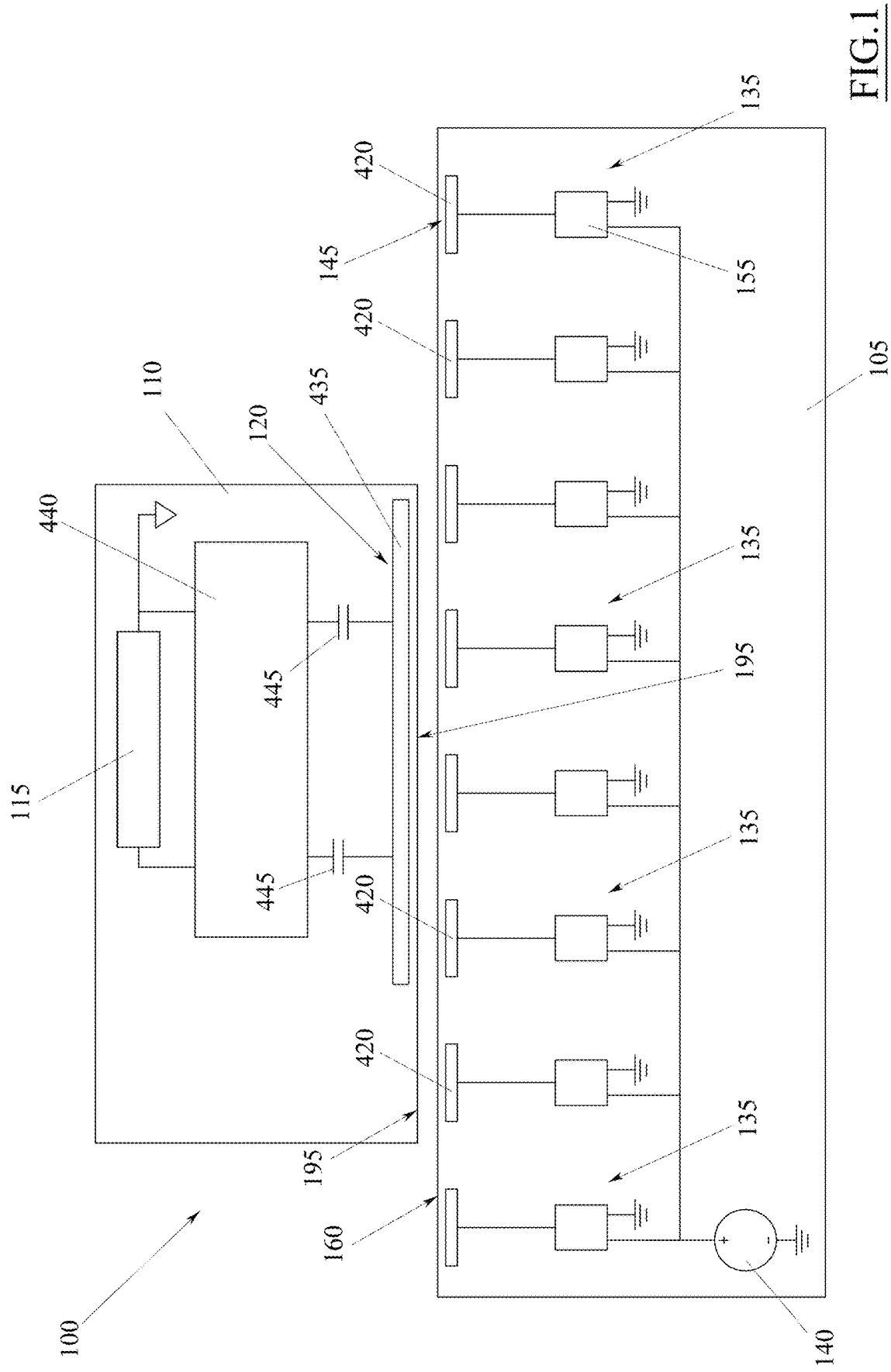
FIG. 1 is a general diagram of a system for transferring electrical power according to the present invention.

With reference to the general diagram of FIG. 1, the system 100 for the wireless transfer of electrical power comprises a power supply device 105 and a device to be powered 110, wherein the device to be powered is physically separate and independent from the power supply device 105. In other words, the device to be powered 110 is any device that can be freely displaced in space independently from the power supply device 105, e.g. it can be approached and moved away with respect to the power supply device 105, without any type of physical link between the two devices.

By way of example, the device to be powered 110 can be a cellular telephone, a tablet, a computer, a television set, a lighting system e.g. LED, a home appliance, a wearable device, an IOT device, a vehicle, sensor, actuator or any other electrical/electronic device that needs an electrical power supply to be placed in operation and/or to recharge its own internal batteries.

The device to be powered 110 schematically comprises at least one electrical load 115 to be powered (e.g. batteries) and an apparatus 120 for receiving electrical power connected to the electrical load 115.

The device to be powered 110 may also comprise a rectifier 440, which is connected in series between the receiving apparatus 120 and the electrical load 115, in order to transform an AC voltage applied to the receiving apparatus 120 into a DC voltage useful to power the electrical load 115.

The power supply device 105 comprises a plurality of sets 135 for transmitting electrical power, which can be powered by a voltage generator 140.

It should be specified right away that the voltage generator 140 herein means any electrical device able to generate a difference of electrical potential (voltage) that remains substantially constant over time. Such a device could thus be both a device able directly to generate a constant voltage across its ends, e.g. an electric battery, but it could also be a rectifier able to transform an alternating current, e.g. coming from a normal household electric distribution grid, into a DC voltage, or it could be a DC/DC converter, able to transform a starting DC voltage into the appropriate voltage able to power the transmission sets 135.

Each transmission set 135 schematically comprises an apparatus 145 for transmitting electrical power to a power circuit 155.

In a general sense, the transmitting apparatus 145 is an apparatus able to realize, with the receiving apparatus 120 of the device to be powered 110, a non-conductive electrical coupling, e.g. inductive, capacitive or hybrid inductive and capacitive, or to radiate energy like an antenna.

The power circuit 155 is a circuit able to receive a driving signal and to apply to the transmitting apparatus 145 a variable voltage wave periodically over time with sufficient frequency and amplitude to provide the electrical power necessary to power the electrical load 115.

This voltage wave is generally obtained by the power circuit 155 connecting the corresponding transmitting apparatus 145 to the voltage generator 140 intermittently and periodically, with a frequency equal to the frequency of the driving signal.

The driving signal can be a square wave voltage signal having a pre-set value of frequency and duty-cycle. In particular, the driving signal can have rather high frequency, e.g. in the order of MHz, tens of MHz or hundreds of MHz.

To generate the driving signal, in some embodiments each power circuit 155 of the power supply device 105 is provided with a signal generator (e.g. an oscillator or another clock generation system).

Alternatively, the power supply device 105 can comprise a single signal generator for all power circuits 155, or a lower number of signal generators than the number of power circuits 155, and be adapted to distribute the driving signal from each signal generator to the related power circuits 155 by means of an appropriate bus.

Figure 2:
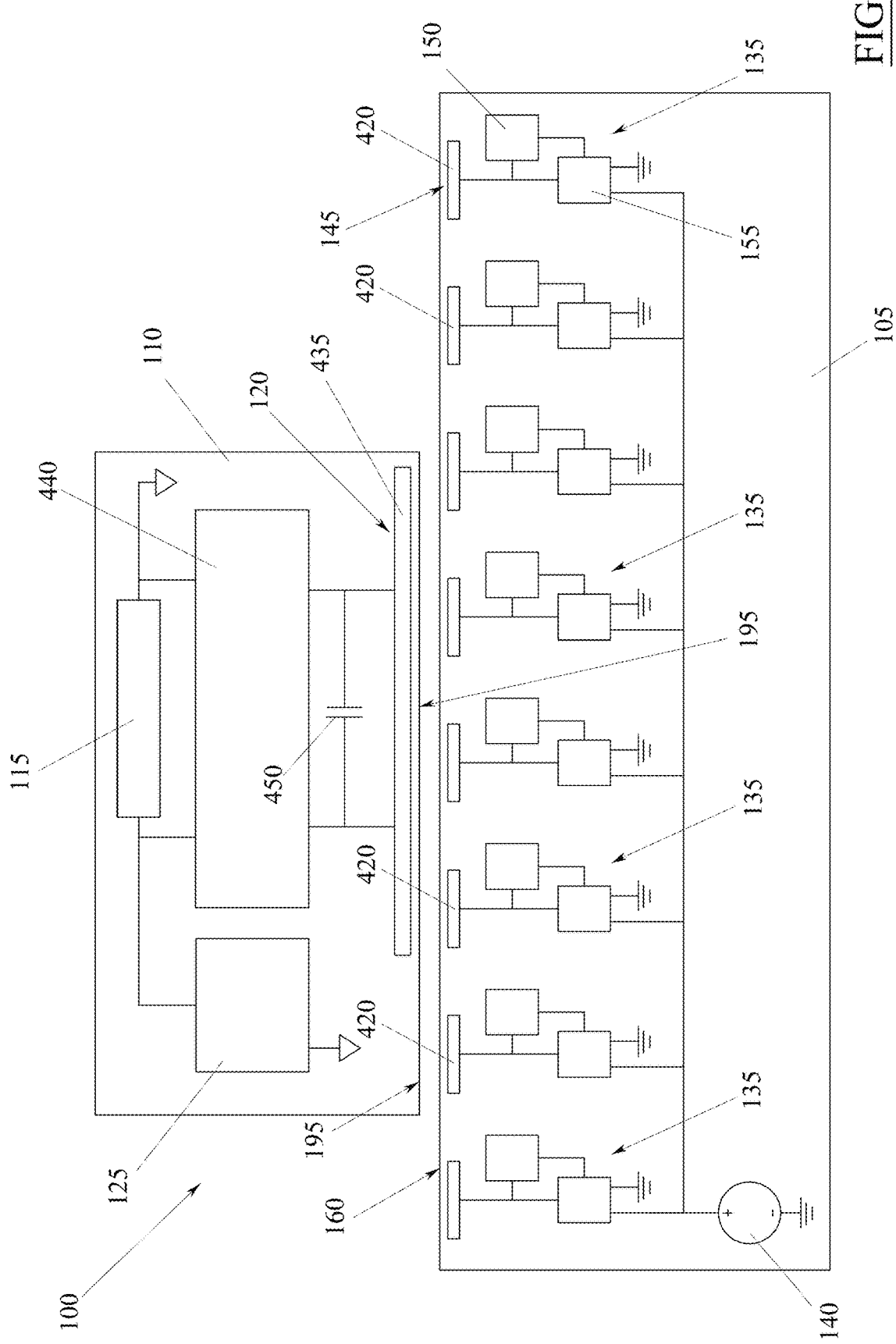
FIG. 2 is a general diagram of a system for transferring electrical power according to a variant of the present invention.

In a different embodiment, schematically shown in FIG. 2, the device to be powered 110 instead can comprise a control circuit 125 that can be powered by the electrical load 115, which can read the voltage and/or the current or other electrical measures applied to the electrical load 115 and which is able to generate clock signals.

The clock signals generated by the control circuit 125 are typically voltage signals, e.g. square wave, having a pre-set value of frequency and duty-cycle. In particular, these clock signals can be at high/very high frequency, e.g. in the order of hundreds of MHz or even of GHz.

In this case, each transmission set 135 of the power supply device 105 can comprise a signal management circuit 150, which is able to receive the clock signal generated by the control circuit 125 of the device to be powered 110 and to generate the driving signal for the power circuit 155 on the basis of that clock signal.

In this way, since the driving of each power circuit 155 is always obtained exploiting the clock signal generated by the control circuit 125 positioned on the device to be powered 110, the power supply device 105 does not need to be equipped with any other clock signal generator (e.g. oscillator).

This feature, together with the fact that the device to be powered 110 (e.g. cellular telephone, tablet or a computer) is generally already equipped with a control circuit 125 able to generate high frequency clock signals for its own operation, clearly entails a drastic reduction in the costs necessary for the implementation of the wireless power transmission technology. In addition to this evident advantage, there are others, e.g. the greater simplicity of construction, the elimination of clock distribution buses, a typical source of electromagnetic emissions, and the possibility of creating a system that is fault tolerant, inasmuch as it is based on transmission sets 135 that are mutually autonomous.

Regardless of the way the driving signal is generated, thanks to the electrical and/or magnetic coupling that is achieved between the transmitting apparatuses 145 of the power supply device 105 and the receiving apparatus 120 of the device to be powered 110, the voltage wave generated by the power sets 155 is able to reach and to power the electrical load 115, without the need for any conductive electrical connection between the power supply device 105 and the device to be powered 110.

Thanks to the multiplicity of the transmission sets 135, this transmission of electrical power can be obtained for different relative positions of the device to be powered 110 relative to the power supply device 105. In particular, it is possible to arrange the transmitting apparatuses 145 of the different transmission sets 135 according to a matrix distribution, realizing in the power supply device 105 an operating surface 160, whereon the device to be powered 110 can be placed in multiple positions and different orientations, in each of which the transmitting apparatuses 145 that are in proximity to the device to be powered 110 will be able effectively to power the electrical load 115, while the transmitting apparatuses 145 that are not involved in the transmission of electrical power may be kept unpowered, reducing electrical losses and electromagnetic pollution.

In this regard, the apparatus 100 can comprise an electronic monitoring and selection system, e.g. a microprocessor-based system, programmable logic, wired logic, integrated circuit board or other, possibly provided with appropriate analog or digital signal conditioning circuits, which is configured to detect the relative position between each transmission set 135 and the device to be powered 110 and to identify, based on this detection, an array of transmission sets 135 whose transmitting apparatuses 145 are in suitable position to achieve the coupling with the receiving apparatus 120 of the power supply device 110.

The apparatus 100 also comprises an electronic control system, also microprocessor based, programmable logic, wired logic, integrated circuit board or other, which is connected to the transmission sets 135 of the power supply device 105 and is configured to activate the power circuits 155 only of the transmission sets 135 that belong to the selected array, possibly leaving the power circuits of all the other transmission sets 135 unpowered.

This control system can be constructed as a separate system from the monitoring and selection system or it could be integrated in a single electronic control system that also integrates the monitoring and selection system.

Another advantage of this solution consists of the possibility of simultaneously powering a multiplicity of devices 110, which can be variously arranged on the aforesaid operating surface 160 of the power supply device 105.

The fact that each transmitting apparatus 145 is connected to its own power circuit 156, also makes the power supply device 105 resistant to localized damages, which at most can destroy a single transmission set 135, leaving the system as a whole completely functioning, Thanks to this feature, the power supply device 105 may be obtained in the form of a pad or sheet that can be cut at will, to give it any useful shape. For example, the aforesaid pad or sheet could be cut and applied on a desk or on a wall, where it can also be holed to make space for screws or other fastening systems e.g. of television sets, shelves, paintings, lighting devices without compromising its functionality.

Starting from this general outline, in a first embodiment of the system 100 shown in FIGS. 1 and 2 the transmitting apparatus 145 of each transmission set 135 can comprise a transmitting inductive element 420 connected to the power circuit 155, in such a way as to obtain an electrical power transmission system of at least the inductive type.

Each transmitting inductive element 420 can have a planar conformation. I.e, it can be in the form of a thin body of electrically conductive material that possess a prevalently inductive electrical behavior, e.g. a wire segment or a strip (typically an inductive strip).

These transmitting inductive elements 420 can individually have elongated form, i.e. they can individually extend in a prevalent direction, e.g. according to a straight or curved line, a polygonal chain or a mixed line.

The inductive elements 420 can be positioned on the operating surface 160 of the power supply device 105 in such a way as to be substantially coplanar or otherwise parallel to the operating surface 160 itself.

This means that, if the operating surface is perfectly flat, the inductive elements 420 will extend at most in only two dimensions of space only (obviously neglecting thickness), but also that the inductive elements may extend in three dimensions, if the operating surface is curved, e.g. slightly domed or concave.

Figure 3:
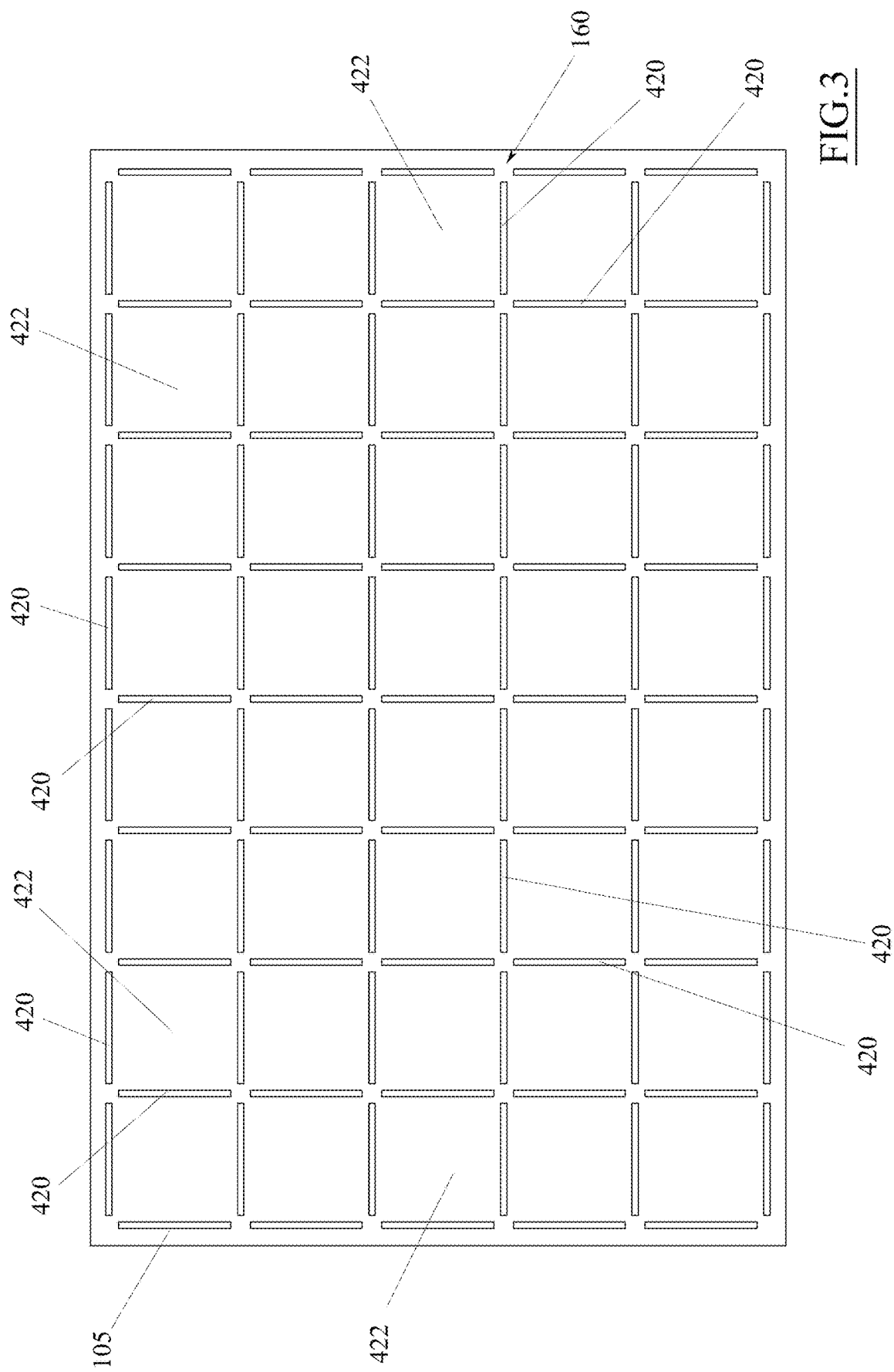
FIGS. 3, 9, 21 and 26 are top views of an active surface of a power supply device according to different embodiments of the present invention.

In particular, the inductive elements 420 can be positioned side by side on the operating surface 160 of the power supply device 105 in such a way as to form a grid, As illustrated in the example of FIG. 3, the transmitting inductive elements 420 can be individually embodied by a rectilinear inductive strip and can be positioned coplanar on the operating surface 160, globally aligned by longitudinal rows and by transverse rows, in such a way that the transverse rows cross the longitudinal rows defining a grid of transmitting inductive elements 420, between which an empty space remains defined which constitutes the mesh 422 of the grid.

In this context, in an embodiment of the system 100 each transmission set 135 can in particular comprise one of the four transmitting inductive elements 420 which delimit a same mesh 422 of the grid, Naturally, however, the transmitting inductive elements 420 may be embodied by planar bodies having the shape of transmission coils. e.g. a single coil with planar configuration that delimits the perimeter of the mesh 422 of the grid.

As is schematically illustrated in FIGS. 1 and 2, the receiving apparatus 120 of the device to be powered 110 can correspondingly comprise one or two receiving inductive elements 435, which are able to realize an inductive coupling with one or more transmitting inductive elements 420 of the device to be powered 110.

Each receiving inductive element 435 can be positioned substantially flush and coplanar on a receiving surface 195 of the device to be powered 110, which can have a complementary shape to the operating surface 160 of the power supply device 105.

In general, the number, the shape, the dimension and the disposition of the receiving inductive elements 435 must be selected in such a way that, by setting or approaching the receiving surface 195 of the device to be powered 110 to the operating surface 160 of the power supply device 105, an inductive coupling can be created between at least one receiving inductive element 435 and at least one transmitting inductive element 420 of the power supply device 105, preferably between each receiving inductive element 435 and a plurality of transmitting inductive elements 420 arranged in such a way as to reproduce with good approximation its shape and dimensions, this for multiple positions and/or relative orientations of the device to be powered 110 with respect to the power supply device 105, preferably for any position and/or orientation of the device to be powered 110, According to an embodiment, the receiving inductive element 435 can be embodied by an inductive conductor having the shape of a coil or receiving antenna, which can be connected to the electric load 115 through the rectifier 440.

For example, the receiving apparatus 120 could comprise a receiving inductive element 435 shaped like a coil that extends coplanar on the receiving surface 195 as shown in FIG. 4.

To transfer electrical power by means of the inductive coupling between the receiving inductive element 435 and the transmitting inductive elements 420, the power circuit 155 of each transmission set 135 can comprise two switching circuits 425 (see FIG. 5), which are connected to the opposite ends of the respective transmitting inductive element 420 (or of the respective series of transmitting inductive elements 420 that define the transmitting apparatus 145).

These two switching circuits 425 can be driven at the same frequency but mutually opposite in phase.

Alternatively, it is sufficient for one of the switching circuits 425 to be driven with any phase and for the other one to be controlled in such a way as to maintain the second end of the transmitting inductive element 420 (or of the array of transmitting inductive elements 420) constantly connected to a reference potential, e.g. to ground.

In this sense, it is thus also possible that the power circuit 155 comprises a single switching circuit 425 connected to one end of the transmitting inductive element 420 (or of the array of transmitting inductive elements 420), and that the other end is constantly connected to the reference potential, e.g. to ground.

Thanks to all the proposed solutions, each transmitting inductive element 420 is traversed by a voltage wave that is transferred to the receiving inductive element 435 in an inductive magnetic way and can thus be used to power the electrical load 115 through the rectifier 440.

To obtain high performance and efficiency in the transfer of electrical power, it is preferable for each switching circuit 425 to be able to generate a voltage wave having very high frequency (e.g. in the order of MHz, tens of MHz or hundreds of MHz) and sufficient amplitude to power the electrical load 115.

A particularly convenient way to obtain this result consists of using a switching circuit 425 constructed according to soft switching, nearly resonating or totally resonating schemes, wherein the circuit topology and the driving system make it possible to eliminate almost completely the dynamic losses in the switches, thus allowing high switching frequencies 425 and low losses. A category of switching circuits 425 that advantageously achieves these objectives derives from the appropriate modification of class D, E. F or E/F amplifiers.

Figure 6:
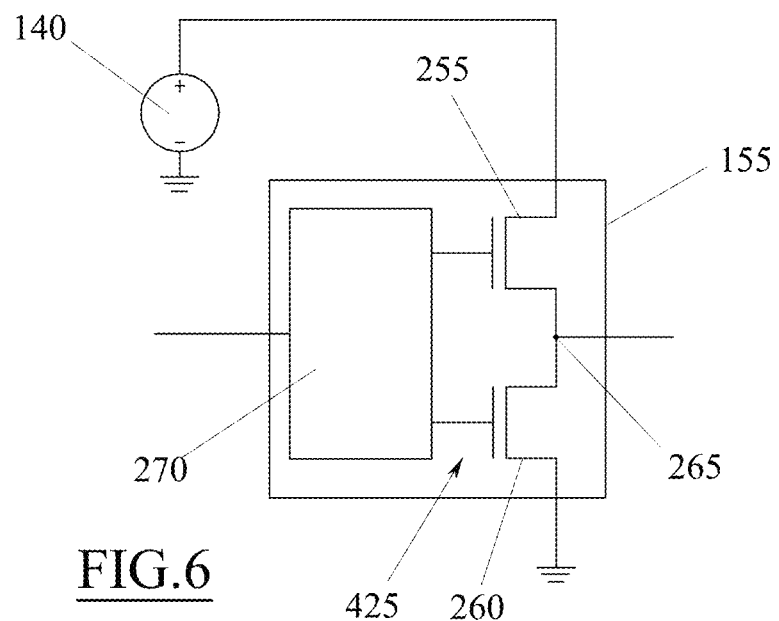
FIGS. 6 and 7 show the circuit diagrams of two possible switching circuits for the transmission sets.

By way of example, each switching circuit 425 can comprise a pair of switches 255 and 260 connected in series between voltage generator 140 and a reference potential (e.g. a mass), as illustrated in the diagram of FIG. 6.

In particular, the first switch 255 is connected to the voltage generator 140 while the second switch 260 is connected to the reference potential (obviously different from that of the voltage generator 140), e.g. to the ground potential.

Between the first and the second switch 255 and 260 is present a central node 265, which is connected to the transmitting inductive element 420 or to the array of transmitting inductive elements 420 that define the transmission apparatus 145.

This pair of switches 255 and 260 fundamentally constitutes a hall bridge H useful to generate the high frequency voltage wave that powers the transmitting armature 165.

The pair of switches 255 and 260 can be, for example, a pair of high performance BJT, IGBT, N-channel MOSFET, P-channel MOSFET, CMOS pair, FET transistors based on GaN, GaAs, SiC or another switch.

In this way, it is advantageously possible to generate the voltage wave simply by alternately turning on and off the two switches 255 and 260 at the frequency of the driving signal.

To drive the two switches (e.g. MOSFET), an appropriate driver 270 may be necessary, which, receiving the driving signal, converts this signal into appropriate waves (typically amplified in voltage and/or current) adequate to alternately turn on and off the two switches typically at high frequency.

This type of switching circuit 425 is, however, penalized by the presence of two switches 255 and 260, typically operating at high frequency. Of these switches, the first switch 255 is the more critical one, because it is typically referred to a floating node and hence necessitating a bootstrap circuit that is poorly functional and is costly at high frequency. Alternatively, the first switch 255 can, for example, consist of a P-MOS, but in this case the performance is typically lower and the area occupied by the P-MOS is greater than an N-MOS with similar performance.

To overcome these drawbacks and further to simplify the system 100 (see FIG. 7), each switching circuit 425 can comprise an inductor 275 (known as choke) and a switch 280 connected in series between the voltage generator 140 and the reference potential (e.g. a ground), in which the inductor is directly connected to the voltage generator 140 while the switch 280 is connected to the reference potential.

In practice, the inductor 275 serves as a current generator, replacing the first switch 255 of the previous embodiment.

In this case as well, the switch 280 can be, for example, a high performance BJT, IGBT, N-channel MOSFET, P-channel MOSFET, CMOS, FET transistor based on GaN. GaAs, SiC or another switch.

Between said inductor 275 and the inductor 280 a central node 285 is comprised, which is connected to the respective end of the transmitting inductive element 420 or of the array of transmitting inductive elements 420 that define the transmission apparatus 145.

In parallel to the switch 280, a capacitance 290 of appropriate value can be further introduced, which can also be constituted in whole or in part by the parasitic capacitance of the switch 280, useful to reduce the losses of the circuit avoiding voltage-current crossings in the phases of turning the switch on and off.

In this way, it is advantageously possible to generate the voltage wave simply by alternately turning on and off the sole switch 280 at the frequency of the driving signal.

To drive the switch, in this case as well, an appropriate driver 295 may be necessary which, receiving the driving signal, converts the signal into an appropriate wave able to turn the switch 280 on and off at high frequency.

Returning to FIG. 5, between the switching circuits 425 and transmitting inductor 420 or the series of transmitting inductors 420 can be placed an appropriate, typically reactive matching network 430. This matching network 430, if appropriately tuned, allows the overall circuit to be deemed akin to a resonating circuit of the Zero Voltage Switch (ZVS) or Zero Current Switch (ZCS) type, considerably limiting losses and allowing considerable increases of the operating frequency, thus assuring low cost and reduced size of the circuit and high transmitted power density.

Substantially for the same reasons, in series between the receiving inductor 435 and the rectifier 440 of the device to be powered 110 (see FIG. 1), it is possible to insert capacitors 445 useful to create a resonator that can also allow the inductive reception part to function in ZVS (zero voltage switching) or ZCS (zero current switching) mode.

Figure 8:
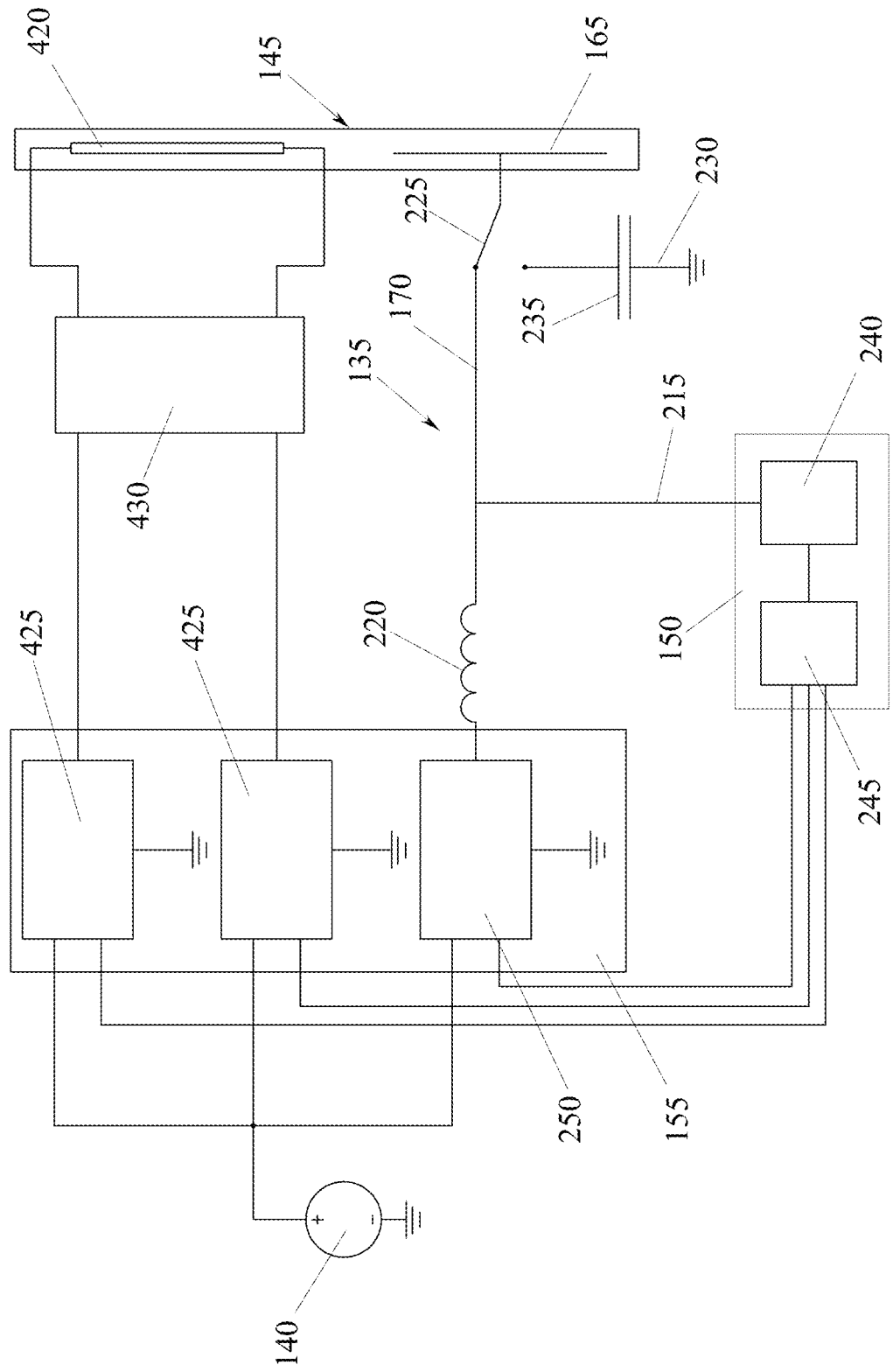

Alternatively, instead of the capacitors 445 in series, it is possible to insert a capacitor 450 in parallel to the receiving inductive element 435 (see FIG. 2), useful to form a resonating tank that can facilitate the coupling with a resonating primary inductive circuit also at greater distances between transmitting inductive element 420 and receiving inductive element 435 with respect to the series resonating circuit According to a common aspect to all embodiments described above, the transmitting apparatus 145 of each transmission set 135 can further comprise at least one transmitting apparatus 165, which can be connected to the corresponding power circuit 155 from an appropriate electrical branch 170, as shown in FIG. 8.

In this way, it is possible to obtain a hybrid capacitive and inductive power transmission system.

The transmitting armature 165 can be embodied for example by a plate, a strip, a sheet or by any other format of conductor material. The transmitting armature 165 can, for example, have rectangular or square shape, without thereby excluding other shapes, e.g. triangular, circular, hexagonal or other shapes.

The transmitting armatures 165 of the various transmission groups 135 can be positioned side by side, e.g. coplanar, on the aforementioned operating surface 160.

In particular, the transmitting armatures 165 can be substantially flush with the operating surface 160, which may be covered by a preferably thin layer of dielectric material.

The transmitting armatures 165 can, in addition, be mutually positioned in space in a more or less regular way, mutually contiguous or distant. For example, the transmitting armatures 165 can be arranged according to a unidimensional distribution, i.e. mutually aligned to form a single row, or they can be distributed over multiple dimensions, e.g. according to a matrix structure, in which the transmitting armatures 165 are aligned on rows and column substantially like the nodes of a matrix.

As stated, the transmitting armatures 165 can have several dimensions and/or geometric shapes. In particular, the shape and/or the size of the transmitting armatures 165 can vary both among different models of the power supply device 105 and within the same model of power supply device 105. The transmitting armatures 165 can be positioned on a support that may be rigid or flexible, soft or hard, planar or not planar, of any shape, thickness or size. For example, the transmitting armatures 165 can be embodied applying conductive strips on a thick or thin dielectric substrate, or incorporating said conductive strips between two layers of dielectric material, or else modifying the electrical properties of a non-conducting material to become locally conducting.

Figure 9:
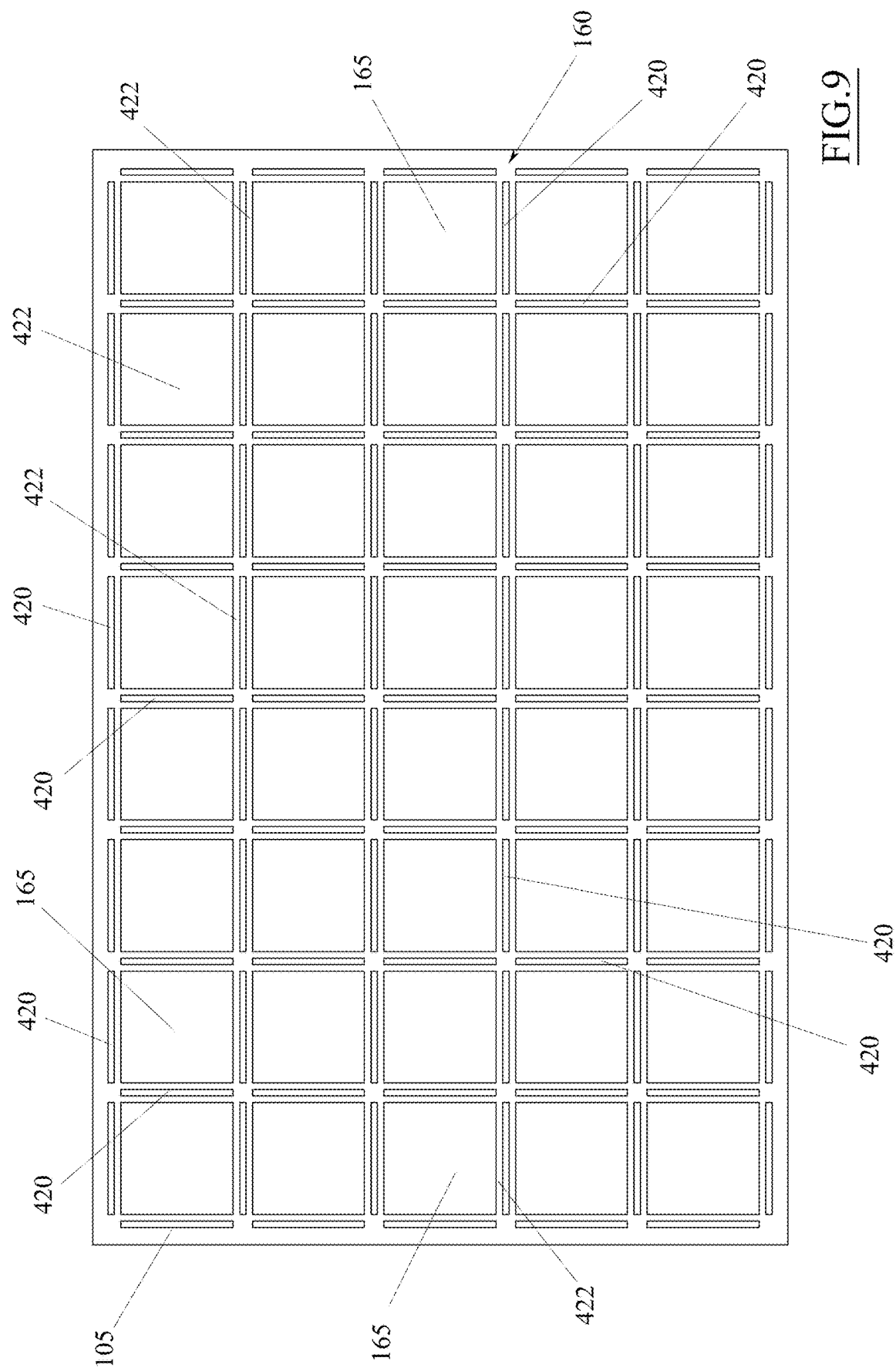

In particular, each transmitting armature 165 can be positioned within a respective mesh 422 of the grid of transmitting inductive elements 420, preferably within the mesh 422 whose perimeter is partially defined by the transmitting inductive elements 420 that belong to the same transmission set 135 of said transmitting armature 165, as shown for example in FIG. 9.

In this way, between each pair of consecutive transmitting armatures 165 is always interposed at least one transmitting inductive element 420 and each transmitting armature 165 is surrounded on all sides by a set of transmitting inductive elements 420. It is stressed that the particular implementation shown, which is only one of the possible implementations, achieves the advantage of providing on the operating surface 160 a matrix, homogeneous distribution of the transmitting armatures 165.

Returning to FIG. 8, for each transmitting armature 165, the power circuit 155 may comprise an additional switching circuit 250, substantially of the same type as the switching circuits 425 associated to the transmitting inductive elements 420, which is able to connect the voltage generator 140 to the transmitting armature.

This switching circuit 250 is driven in such a way as to convert the power supply voltage produced by the voltage generator 140 in an AC voltage wave, typically at high frequency (hundreds of kHz, MHz, tens of MHz or even hundreds of MHz), which is applied to the transmitting armature 165.

Figure 10:
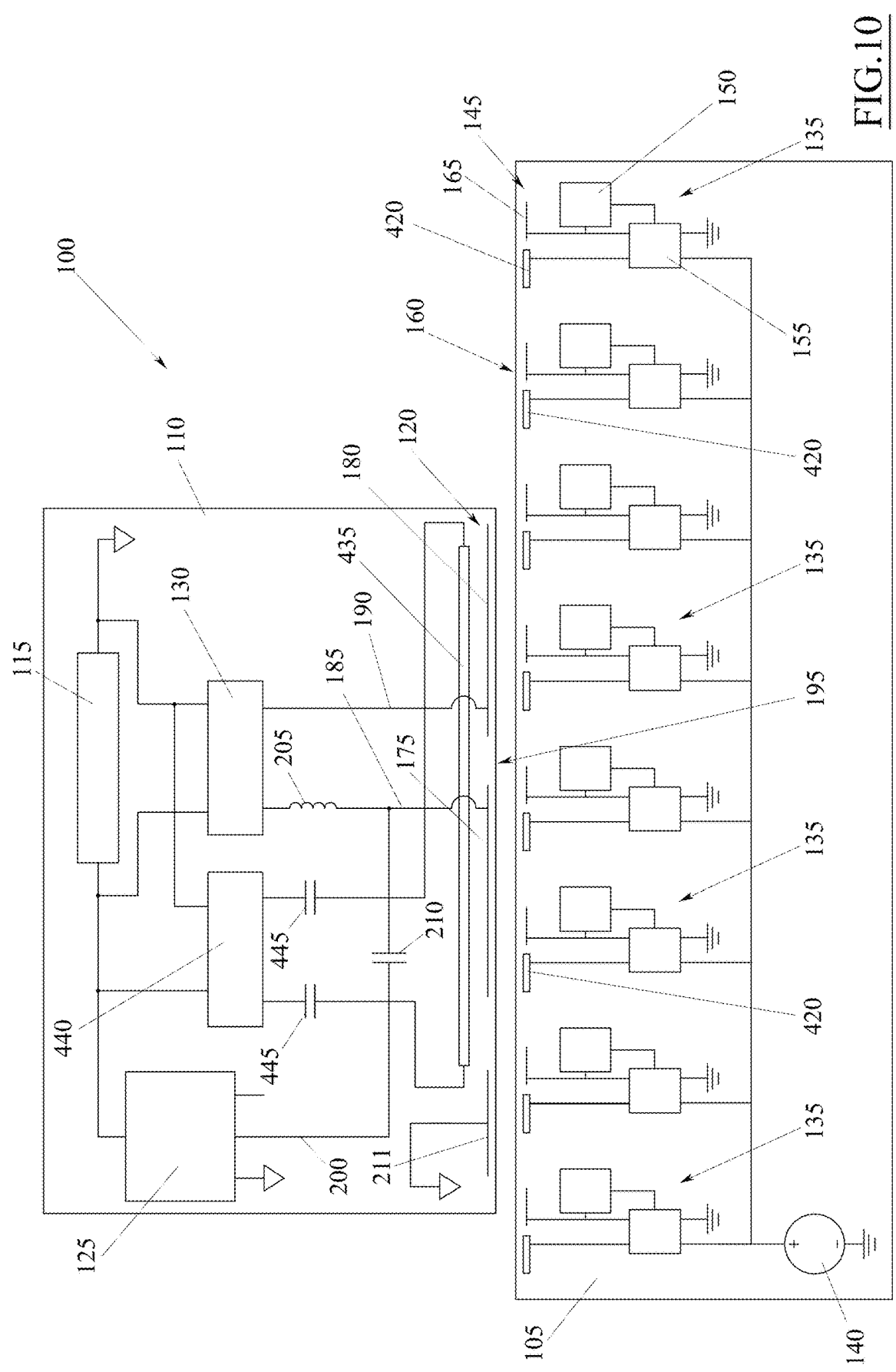

As shown in FIG. 10, to couple electrically with the transmission groups 135 of this second embodiment, the receiving apparatus 120 of the device to be powered 110 can further comprise at least one pair of receiving armatures, whereof a first receiving armature 175 and a second receiving armature 180, which can be connected to the electrical load 115 through a respective electrical branch, indicated respectively with 185 and 190.

Figure 11:
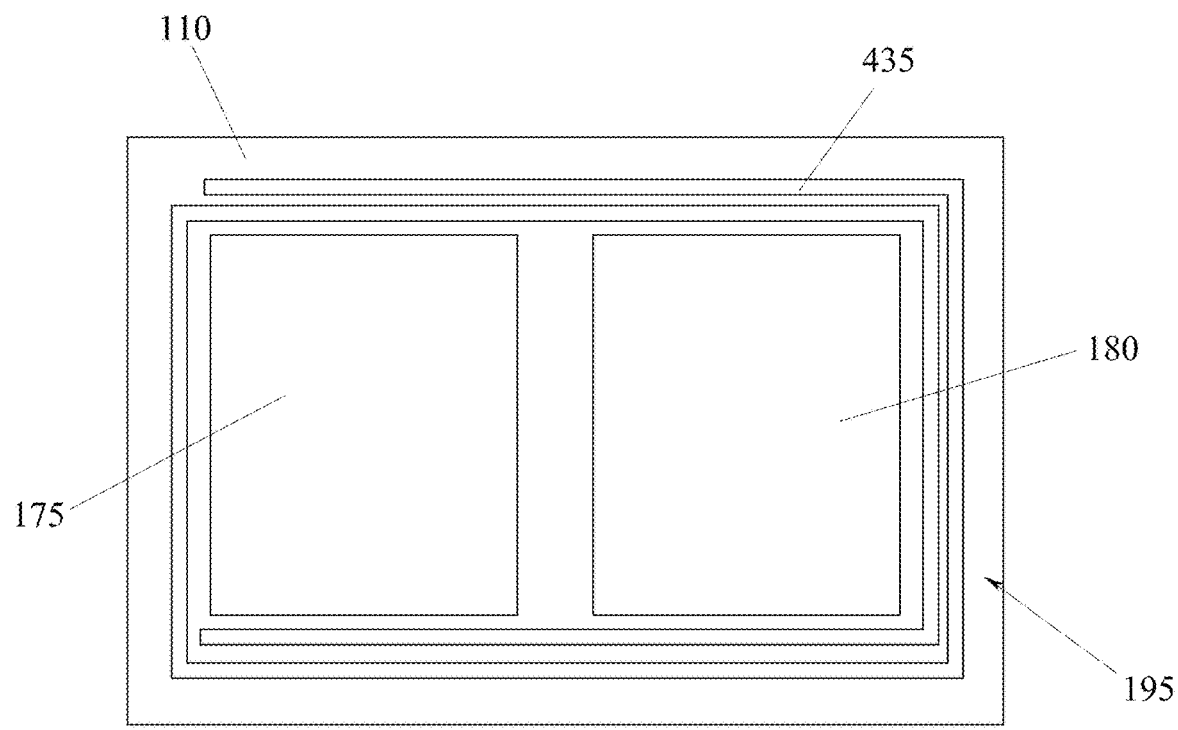

According to an embodiment, the receiving armatures 175 and 180 can be connected to the load 115 independently with respect to the receiving inductive element 435, e.g. through the interposition of a second rectifier 130. The receiving armatures 175 and 180 can also be embodied as plates, strips, sheets or other format of conductor material and they generally have far larger dimensions than the transmitting armatures 165. Each receiving armature 175 and 180 may be embodied by multiple small plates, appropriately connected to each other, e.g. to minimize electromagnetic pollution problems. The receiving armatures 175 and 180 can be arranged mutually side by side, e.g. coplanar, on the receiving surface 195. The receiving armatures 175 and 180 are positioned substantially flush with the receiving surface 195, possibly coated with a preferably thin dielectric layer. For example, both receiving armatures 175 and 180 can be located inside the coil that defines the receiving inductive element 435, as shown in FIG. 11.

The size and/or the shape of the receiving armatures 175 and 180 can be different both for different devices to be powered 110 and within each individual device to be powered 110, e.g. according to the dimensions of the device, of the geometric constraints present on the device itself and of the power necessary for the correct operation of the device itself.

What matters is that shape, size and disposition of the receiving armatures 175 and 180 of the device to be powered 110 and the number, shape, size and disposition of the transmitting armatures 165 on the power supply device 105, are such that, setting down or approaching the receiving surface 195 of the device to be powered 110 on the operating surface 160 of the power supply device 105, the first receiving armature 175 faces the transmitting armature 165 of at least a first transmission set 135, and the second receiving armature 180 faces the transmitting armature 165 of a second transmission set 135, for multiple positions and/or relative orientations of the device to be powered 110 with respect to the power supply device 105, preferably for any position and/or orientation of the device to be powered 110.

In this way, in all the aforesaid positions and/or orientations of the device to be powered 110, the first and second receiving armature 175 and 180, together with the transmitting armatures 165 facing them, will embody at least a pair of electrical capacitors that constitute impedances able to realize a capacitive wireless connection between the power supply device 105 and the device to be powered 110.

To allow a transfer of electrical power through this capacitive coupling, the switching circuits 250 connected to the transmitting armatures 165 that face the first receiving armature 175 can be driven in such a way as to apply to these armatures a voltage wave having the frequency of the driving signal, while the transmitting armatures 165 that face the second receiving armature 180 can be referred to a reference potential (e.g. to ground).

In this way, between the first and the second coupling capacitor there is a voltage difference that is variable over time, able to power the electrical load 115 positioned on the device to be powered 110.

As stated previously, the driving signal can be generated by a signal generator (e.g. by an oscillator) positioned directly in the power supply device 105, which can also be used to drive the switching circuits connected to the corresponding transmitting inductive elements 420, possibly after modification (e.g. frequency inversion and/or reduction).

Alternatively, the driving signal for the switching circuits 250 and 245 can be generated by the signal management circuit 150 that receives a clock signal produced and transmitted by the control circuit 125 positioned in the device to be powered 110.

This clock signal can be received by the signal management circuits 150 connected to the transmitting armatures 165 facing the first receiving armature 175 by means of any non/conductive communication system between the two circuits. e.g. inductively, possibly using a small independent antenna.

According to a preferred aspect of the system, the control circuit 125 of the device to be powered 110 can, however, apply the clock signal directly to the first receiving armature 175, and each signal management circuit 150 can receive the clock signal directly from the corresponding transmitting armature 165.

In particular, the control circuit 125 can apply the clock signal to the electrical branch 185 that connects the first receiving armature 175 to the electrical load 115, e.g. through an electrical branch 200 converging in a connecting node located between the first receiving armature 175 and the rectifier 130 (if present).

An inductor 205, typically of high value (e.g. in the order of tens or hundreds of nH), can be connected in series along the electrical branch 185 between the aforesaid connecting node of the control circuit 125 and electrical load 115. e.g. between the connecting node and the rectifier 130, which enables the voltage wave coming from the power supply device 105 to reach the electrical load 115 but prevents the passage of the clock signal generated by the control circuit 125 which is then forced to pass from the device to be powered 110 towards the power supply device 105.

An electrical capacitance 210, typically of small value (e.g. In the order of tens or hundreds of pF), can also be connected in series along the electrical branch 200, between the connecting node and the control circuit 125, which allows the clock signal to reach the first receiving armature 175 but prevents the passage of the voltage wave which then cannot reach the control circuit 125.

On the device to be powered 110 can lastly be present a third armature 211 connected to a reference potential (e.g. to ground), which is useful to create a low impedance path between the grounds of the circuits positioned on the device to be powered 110 and the masses of the circuits positioned on the power supply device 105, at least at the transmission frequencies of the clock signal.

As illustrated in greater detail in FIG. 8, the signal management circuit 150 of each transmission set 135 can be able to capture the clock signal of the electrical branch 170 that connects the switching circuit 250 to the transmitting armature 165, e.g. through an electrical branch 215 that is derived directly from said electrical branch 170.

An inductor 220 can be positioned along the electrical branch 170 between the switching circuit 250 and the node from which the electrical branch 215 is derived, which can have a sufficiently high value (e.g. in the order of tens of nH or hundreds of nH) to prevent the clock signal coming from the control circuit 125 positioned on the device to be powered 110 can interact with the power circuit 155, letting the voltage wave to the transmitting armature 165.

In this way, the clock signal generated by the device to be powered 110 can advantageously be captured by the signal management circuit 150 from the transmitting armature(s) 165 that face the first receiving armature 175 through the same capacitive coupling that also enables the power transfer, simplifying and streamlining the power supply device 105.

To each of said transmitting armatures 165, and to the transmitting inductive elements 420 that are a part of the same transmission sets 135, it will thus be possible to apply the voltage wave able to transfer power to the electrical load 115, while all the other transmitting armatures 165 and the other transmitting inductive elements 420 of the power supply device 105 will remain unpowered or referred to a reference potential (e.g. to ground).

In this regard, each transmitting group 135 can comprise an activation switch 225 located along the electrical branch 170 between the signal management circuit 150 and the transmitting armature 165, which is able selectively to connect the transmitting armature 165 to the corresponding power circuit 155 and to the corresponding signal management circuit 150 or to a reference potential (e.g. to ground).

In other words, this activation switch 225 can be selectively switched between a closed configuration, in which it connects the transmitting armature 165 to an electrical branch 230 referred to ground or to another reference potential, and an open configuration, in which it connects the transmitting armature 165 to the electrical branch 170 that is connected to the related power circuit 155 and to the related signal management circuit 150.

An electrical capacitor 235 can be positioned on the electrical branch 230. e.g. to create a ground connection between the data circuits positioned on the power supply device 105 and on the device to be powered 110, at least at the typical frequencies of the clock signal.

Thanks to this solution, the activation switch 225 can be advantageously used by a control circuit of the power supply device 105 to automatically activate each transmission set 135 in the moment when the corresponding transmitting armature 165 couples with the first receiving armature 175 of a device to be powered 110.

For example, the activation switch 225 of each transmission set 135 can normally be maintained in the closed position, in such a way that the transmitting armature 165 is completely insulated both from the power circuit 155 and from the signal management circuit 150. In this configuration, the signal management circuit 150 is not able to receive any clock signal or any disturbance that could cause the accidental activation of the power circuit 155, which thus remains completely unpowered, reducing the energy consumption and the electromagnetic pollution of the power supply device, while assuring a signal connection between the grounds of the transmission circuit 105 and the device to be powered 110.

Starting from this configuration, the activation switch 225 can be periodically brought to the open configuration for short instants, e.g. with the aid of a timer or of an appropriate counter, connecting the transmitting armature 165 to the power circuit 155 and to the signal management circuit 150. During these short instants, if the transmitting armature 165 does not face the first receiving armature 175 of the device to be powered 110, the signal management circuit 150 will not receive any clock signal, so that the power circuit 155 will remain unpowered and the activation switch 225 will be able to be brought back to a closed configuration. Vice versa, if at the opening of the first activation switch 225 the transmitting armature 165 faces the first receiving armature 175 of the device to be powered 110, the signal management circuit 150 will automatically receive the clock signal and will command the power circuit 155 to power the transmitting armature 165 and consequently the electrical load 115. In this case, it will be possible to maintain the activation switch 225 in the open configuration as long as the signal management circuit 150 continues to receive the clock signal.

Concurrently, the activation switches 225 connected to the transmitting armature(s) that face the second receiving armature 180 of the device to be powered 110, will always remain in the closed configuration since the related signal management circuit 150 never receives any clock signal, maintaining the second transmitting armature 165 connected to the reference potential (e.g. to ground).

This solution then also has the advantage not to require an additional monitoring, selection and control system, to identify and activate only the transmission sets 135 that are able to couple to the device to be powered 100.

According to an embodiment of the system 100, the generation of the clock signal by the control circuit 125 of the device to be powered 110, and hence its capture by the signal management circuit 150, can take place during short phases in which the generation of the voltage wave is temporarily suspended and in which then there is no power transmission. In this case, the clock signal can be used to charge appropriate buffers (not shown) which, during the subsequent power transmission phase, are able to generate the driving signal necessary to drive the power circuit 155, In other words, it is possible to exploit the tendentially short idle times, during which the power circuit 155 is kept unpowered to allow the clock signal to be stored in the buffer, which are subsequently used to generate the driving signal in the following power transmission phase, at the end of which the power circuit 155 is unpowered again to regenerate the control signal. The need to regenerate the control signal derives from the precision with which the constancy of the phase of the signals is assured, inasmuch as all the transmitting armatures 165 facing the first receiving armature 175 must transmit power waves in phase with each other to prevent malfunctions or tosses of power and/or efficiency.

This scheme simplifies the design of the signal management circuits 150, and of any filtering stages, because there is no interference between the clock signal and the voltage wave. Conversely, this approach does not allow the simultaneous transmission of data (control data, but also data usable by the user for other purposes. e.g. to share music, videos, files or other data between multiple devices placed close to the transmission plane) and power, necessitating buffers, increasing the latency and reducing the maximum theoretical passband of the system.

For this reason, in a preferred embodiment of the system 100 the clock signal is generated and captured simultaneously with the generation and application of the voltage wave.

In this case, the signal management circuit 150 of each transmission set 135 preferably comprises a filter 240 positioned on the electrical branch 215 directly connected with the transmitting armature 165, which is able to filter the clock signal.

In particular, the filter 240 can have a high pass characteristic (e.g. tens or hundreds of MHz), able to block or greatly attenuate the power wave, instead letting pass the clock signal coming from the control circuit 125 positioned on the device to be powered 110.

The filter 240 can also have an appropriate low-cut or band-stop characteristic to further attenuate the power wave generated by the power circuit.

It is stressed that the filter 240 constitutes a fundamental part of the system 100 if data and power have to be transmitted simultaneously through the capacitive coupling. In this case, to simplify the filter 240 it can be convenient to distance the frequencies of the clock signal and of the fundamental frequency of the voltage wave as much as possible.

In some embodiments, the filter 240 can be a filter of a higher order than the first, e.g. a Bessel, Chebyshev, Butterworth. Elliptic, inverse Chebyshev filter or other appropriate filters directed at attenuating as much as possible the contribution of the voltage wave in order to obtain from the device to be powered 110 a clock signal that is as clean as possible.

Downstream of the filter 240, the signal management circuit 150 can then comprise an appropriate frequency divider 245 able to reduce the clock signal frequency.

Use of this frequency reducer 245 is particularly useful if the control circuit 125 positioned on the device to be powered 110 is configured to generate very high frequency clock signals, as in the case of computers or of last generation cellular telephone, whose frequency is generally higher than the frequency necessary to effectively drive the power circuit 155, e.g. hundreds of MHz or GHz. This also allows considerably to simplify the filter 240, inasmuch as the frequencies of the power stage and of the clock signal are very distant, and thus it is easy with a simple high-pass filter (e.g. a capacitor of a few pF) to let only the very high frequency clock signal reach the frequency divider 245.

Figure 12:
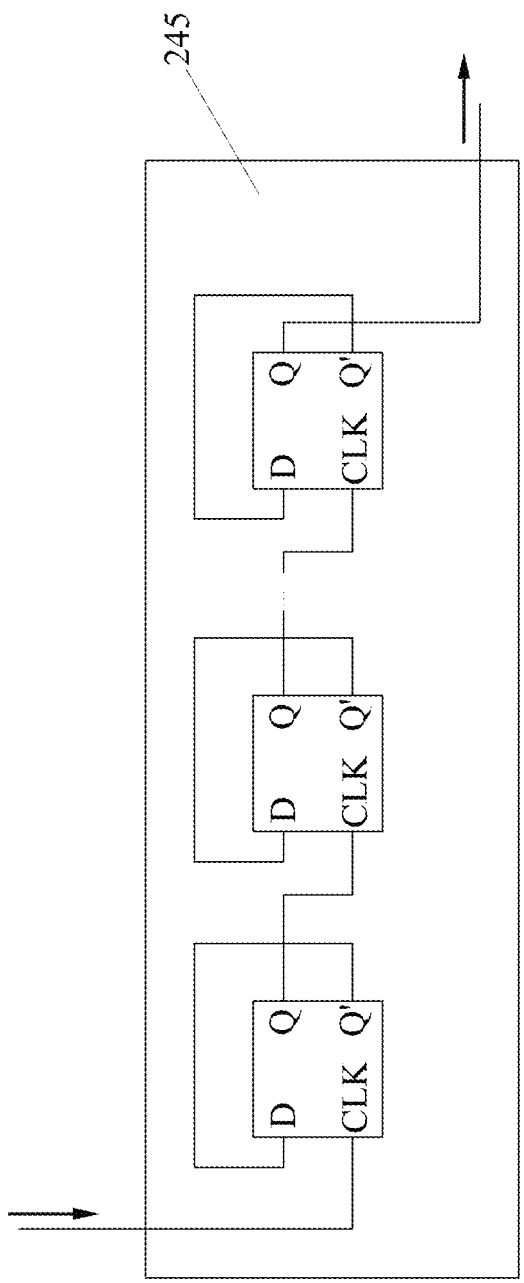
FIGS. 12, 14 and 17 show the circuit diagram of a voltage divider according to as many embodiments of the present invention.

As illustrated in FIG. 12, the frequency divider 245 can comprise a cascade of logic gates, e.g. DQ flip-flops, each of which possess a data input (D), two complementary outputs (Q, Q') and a synchronization input (CLK).

Referring for example to the use of DQ flip-flops, these flip-flops can be mutually connected so that the "original" clock signal, i.e. the one output by the filter 240, enters into the synchronization input of the first DQ flip-flop. The signal Q', inverted signal of the output signal Q, of the first flip-flop DQ is connected to the input D of the same lip-flop DQ, while the output signal Q is connected to the synchronization port CLK of the following DQ flip-flop, and so on It should be noted that the first flip-flop DQ of the cascade modifies the duty-cycle of the "original" clock signal, outputting a new square wave clock signal with duty-cycle equal to 50% irrespective of the duty-cycle of the "original clock signal".

In this way, the output Q of each flip-flop DQ of the cascade is a square wave clock signal having duty-cycle equal to 50% and halved frequency with respect to the received input clock signal.

By appropriately selecting the number of the flip-flops DQ of the cascade, thus, the frequency of the "original" clock signal can be divided to obtain, at the output of the frequency divider 245, a clock signal that can actually be used as a driving signal of the power circuit 155, However, in other embodiments the frequency divider 245 may be based on JK flip-flops, T flip-flops, or other circuits configurable as frequency dividers.

When the system 100 uses a capacitive coupling, the transfer of electrical power to the electrical load 115 can also be obtained in an alternative manner with respect to the one described previously, e.g. applying a pre-set voltage wave to the transmitting armature(s) 165 that face the first receiving armature 175, simultaneously applying to the transmitting armature(s) that face the second receiving armature 180 a voltage wave having the same frequency but offset in phase with respect to the other, preferably with opposite phase.

To obtain this operation, the system 100 described above can be modified as indicated below, maintaining all the other characteristics substantially unchanged.

Figure 13:
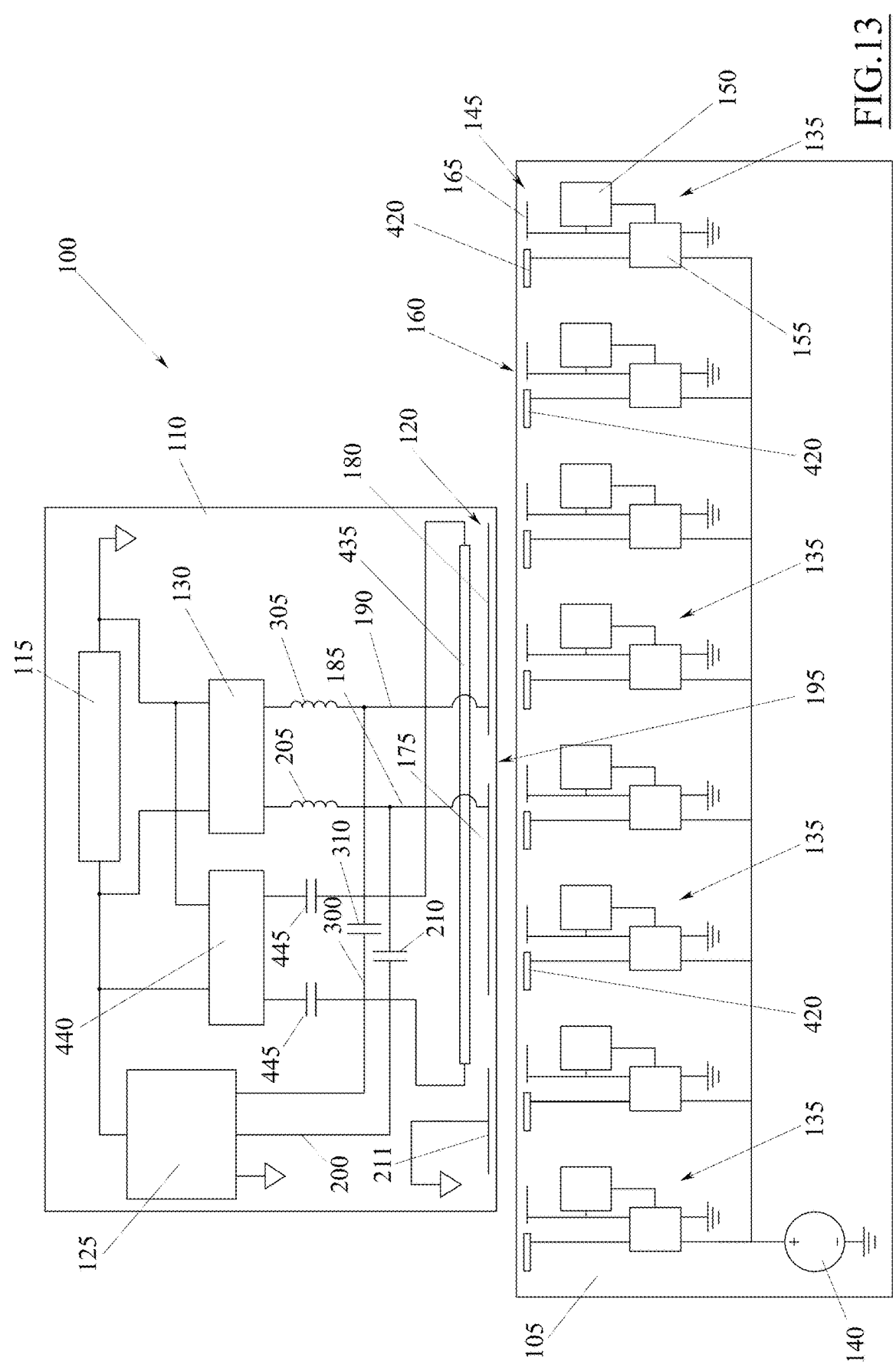

In particular, as illustrated in the circuit diagram of FIG. 13, the control circuit 125 of the device to be powered 110 can be able to generate and to apply a second clock signal to the second receiving armature 180.

For example, the control circuit 125 can apply the second clock signal to the electrical branch 190 that connects the second receiving armature 180 to the electrical load 115, e.g. through an electrical branch 300 converging in a connecting node located between the second receiving armature 180 and the rectifier 130, in a substantially similar manner to the one provided for the first receiving armature 175.

An additional inductor 305, typically of high value (e.g. in the order of tens or hundreds of nH), can be connected in series along the electrical branch 190 between the aforesaid connecting node of the control circuit 125 and electrical load 115, e.g. between the connecting node and the rectifier 130, which enables the voltage wave coming from the power supply device 105 to reach the electrical load 115 but prevents the passage of the second clock signal generated by the control circuit 125 which is then forced to pass from the device to be powered 110 towards the power supply device 105.

The inductors 205 and 305 also serve the purpose of constituting a resonator with the receiving capacitors, thus allowing more power to be transferred to the electrical load 115, as well as a matching of the impedances useful for example to realize ZVS or ZCS converters (that minimize the losses and that can function at extremely high frequencies).

The inductors 205 and 305 also serve the additional purpose of considerably increasing the impedance of the electrical load 115, which as a rule is limited, seen from the control circuit 125, which in this way can function at high frequency because it substantially does not interact with the load.

An electrical capacitance 310, typically of small value (e.g. in the order of tens or hundreds of pF), can also in turn be connected in series along the electrical branch 300, between the connecting node and the control circuit 125, which allows the clock signal to reach the second receiving armature 180 but prevents the passage of the voltage wave, which then cannot reach the control circuit 125.

This system functions all the better, the greater the frequency difference between the voltage wave that powers the electrical load 115 and the carrier of the signals injected by the control circuit 125.

When the second receiving armature 180 faces one or more transmitting armatures 165, the second clock signal is captured by the corresponding signal management circuits 150 and used to appropriately drive the corresponding power circuits 155 in such a way as to apply to said transmitting armatures 165 a voltage wave of equal frequency but offset in phase, preferably with opposite phase, with respect to the one applied to the transmitting armature(s) 165 facing the first receiving armature 175.

This effect can theoretically be obtained configuring the control circuit 125 of the device to be powered 110 so that it generates and applies to the second receiving armature 180 a second clock signal having the same frequency but offset in phase, preferably with opposite phase, with respect to the clock signal that is applied to the first receiving armature 175.

However, this solution is not always usable because some frequency dividers 245, e.g. those based on a cascade of flip-flops DQ, return an output signal having the identical same phase, both starting from a pre-set clock signal and from its inverse (i.e. from a clock signal of equal frequency but opposite phase), therefore in both cases the resulting voltage waves would have the same phase, simply delayed by one cycle of the very high frequency wave.

Figure 14:
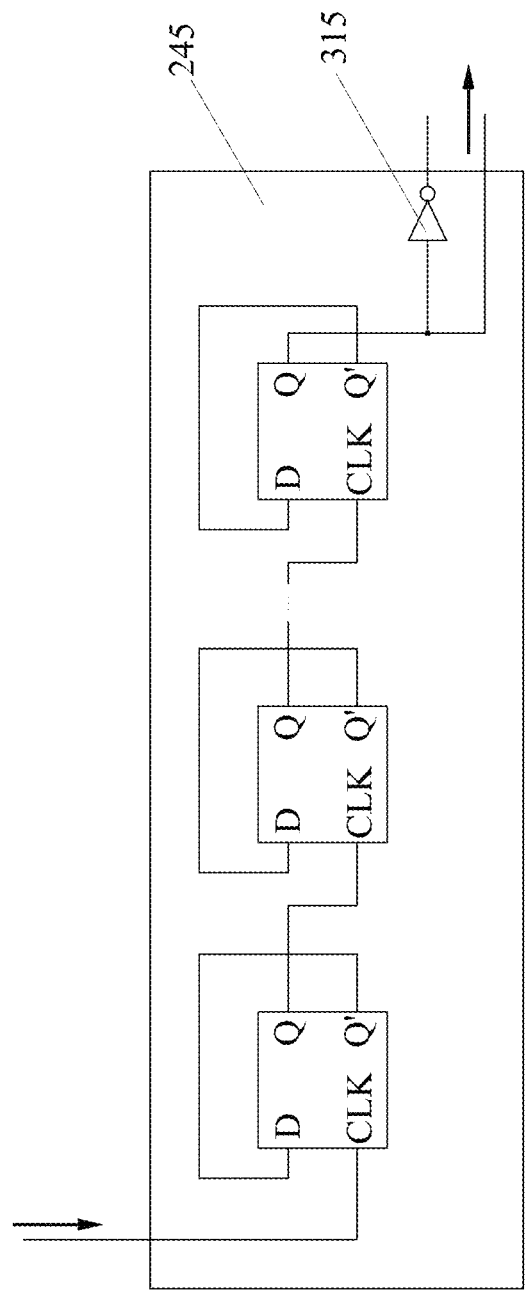

To overcome this drawback, the signal management circuit 150 of each transmission set 135 can be modified in such a way that the output signal of the frequency divider 245 is applied on two independent channels as shown in FIG. 14, one of which is connected to a module 315 able to invert the clock signal output by the frequency divider 245, obtaining a clock signal that is equal but opposite in phase. The module 315 can comprise for example a simple NOT logic gate able to deny the input signal received.

In this way, the frequency divider 245 will always make available two potential driving signals, i.e. a "direct" driving signal, obtained simply by reducing the frequency of the original clock signal, and an "inverse phase" driving signal, obtained by reducing the frequency of the original clock signal and inverting its phase.

Figure 15:
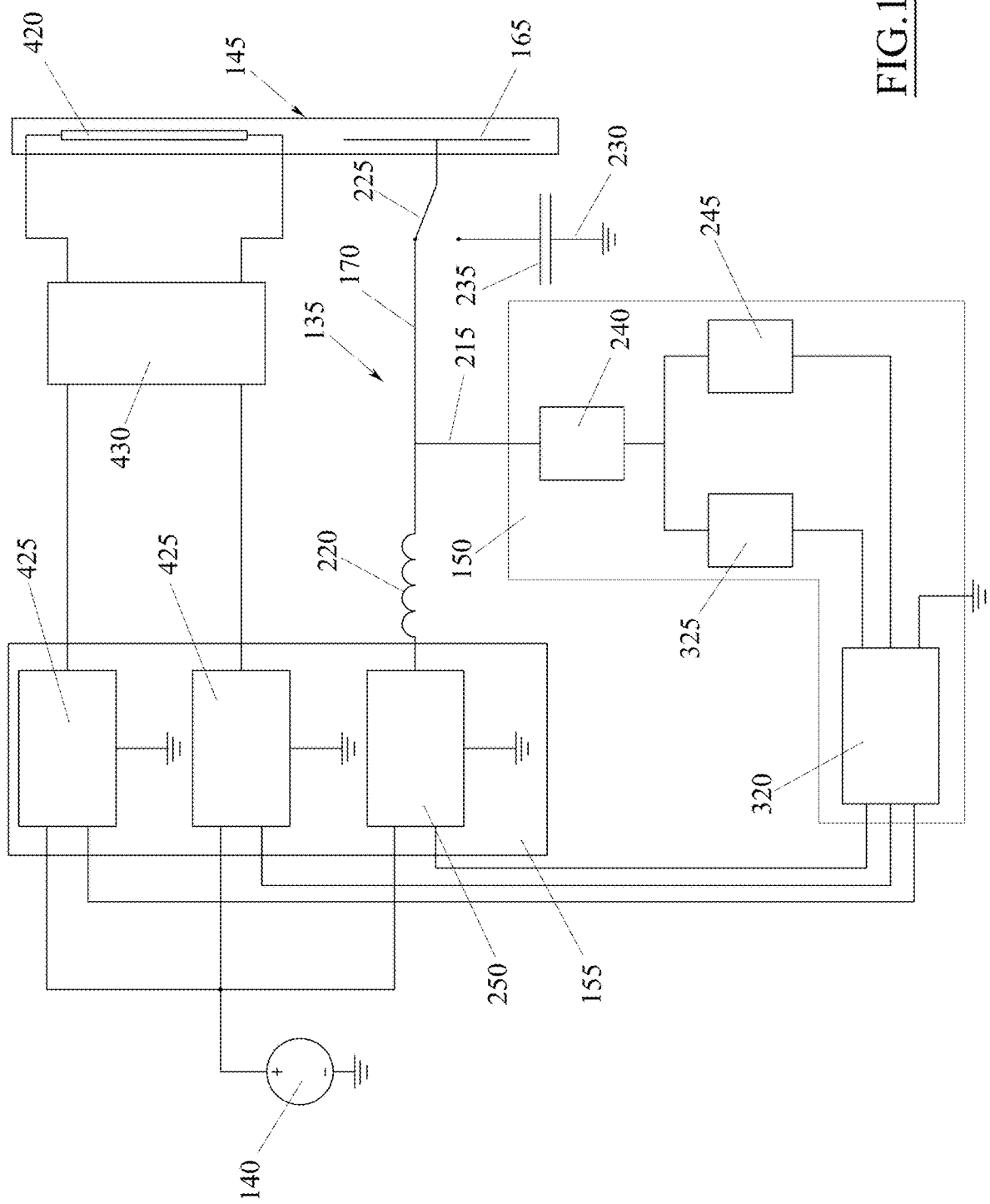

As illustrated in FIG. 15, the signal management circuit 150 of each transmission sets 135 may in this case further comprise a selector 320, which is connected with the frequency divider 245 and is able to send to the switching circuit 250 selectively the "direct" driving signal or the "inverse phase" driving signal, depending on whether the corresponding transmitting armature 165 faces the first receiving armature 175 or respectively the second receiving armature 180.

It should instead be specified that the driving signal sent to the switching circuits 425 can always be the same, i.e. always "direct" or "inverse phase" whether the respective transmitting armature 165 faces the first or the second receiving armature 175 and 180, so that all the transmitting inductive elements 420 coupled with the device to be powered 110 are subjected to the same voltage wave.

To understand whether the transmitting armature 165 faces the first receiving armature 175 or to the second receiving armature 180, the selector 320 can be commanded by a dedicated control module 325, which can implement different strategies.

According to a first strategy, the control circuit 125 of the device to be powered 110 applies to the first receiving armature 175 and to the second receiving armature 180 two square wave clock signals having significantly different duty-cycles (e.g. respectively equal to 20% and 80%). For example to the first value of the duty-cycle (e.g. 20%) may be associated the information "first receiving armature 175", while to the second value of the duty-cycle (e.g. 80%) may be associated the information "second receiving armature 180".

Figure 16:
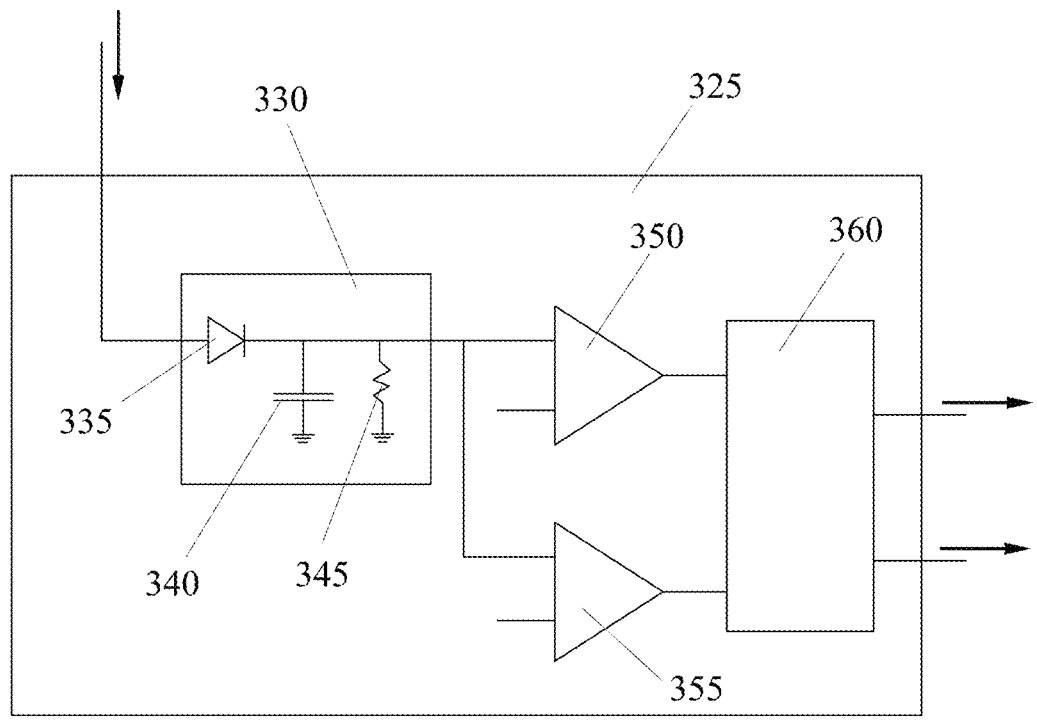
FIGS. 16 and 18 shows the diagram of a control module according to two different embodiments of the invention.

Exploiting this information, the control module 325 can be obtained effectively and simply as a measuring circuit of the effective value of the voltage of the clock signal, e.g. measuring or detecting the Root Mean Square, RMS, of that signal, as illustrated in the diagram shown in FIG. 16.

In particular, the control module 325 can comprise a first stage 330 able to receive the clock signal output by the filter 240, e.g. upstream of the frequency divider 245, and to measure its RMS value.

For example, said first stage 330 can be obtained connecting the output of the filter 240 to the anode of a sufficiently fast diode 335. The cathode of the diode 335 can instead be connected to one end of a capacitor 340, whose other end is connected to a reference voltage, e.g. ground. In parallel to the capacitor 340, the first stage 330 can also comprise a resistor 345 useful to 3.3 discharge the capacitor 340 itself once the input signal ceases.

The output of this first stage 330 is thus a voltage signal proportional to the RMS value of the input signal, which changes according to the duty-cycle and hence to the information "first receiving armature 175" or "second receiving armature 180", allowing the selection of the appropriate driving phase of the transmitting armature 165.

The control module 325 can then comprise a comparator 350 that receives the output signal from the first stage 330 and compares its RMS voltage value to a reference voltage. If the RMS voltage output from the first stage 330 is lower than the reference value, this means that the duty-cycle of the clock signal was low (e.g. 20%), vice versa that the duty-cycle of the clock signal was high (e.g. 80%). It is evident that as the duty-cycle of the clock signal increases, its RMS value also increases, until it exceeds the threshold imposed by the first reference voltage.

The output signal from the first stage 330 can also be applied to a second comparator 355 that compares the RMS voltage value to a second reference voltage, typically close to the ground voltage. If the RMS voltage output from the first stage 330 is lower than the second reference value, this means that the transmitting armature 165 is not receiving any clock signal and therefore that it is not approached to any receiving armature 175 or 180 of the device to be powered 110.

The output of the first comparator 350 and of the second comparator 355 can then be sent to an extremely simple logic module 360, typically but not necessarily with combinatory logic, which is able to generate the driving signals of the selector 320.

In this way, if the RMS signal is higher than the first reference value, the selector 320 will be commanded to drive the power circuit 155 with the "direct" driving signal, if the RMS signal is between the first and the second reference value, the selector 320 will be commanded to drive the power circuit 155 with the inverse-phase clock signal; if, lastly, the RMS signal is lower than the second reference value, the selector 320 will not drive the power circuit 155 and the logic will also bring the activation switch 225 to the open configuration, in order to connect the transmitting armature 165 to the electrical branch 230 and hence to the reference potential (e.g. to ground).

According to a second strategy to understand whether the transmitting armature 165 faces the first receiving armature 175 or the second receiving armature 180, the control circuit 125 of the device to be powered 110 can be configured to apply to the first receiving armature 175 and to the second receiving armature 180 two clock signals having the same duty-cycle but different amplitude.

In this case, the architecture of the signal management circuit 150 of each transmission set 135 can be exactly identical to the one described above and illustrated in FIGS. 15 and 16, since the amplitude of the signal also has a direct impact on the effective value of the voltage of the signal and hence on its RMS.

According to a third strategy to understand whether the transmitting armature 165 faces the first receiving armature 175 or the second receiving armature 180, the control circuit 125 of the device to be powered 110 can be configured to apply to the first receiving armature 175 and to the second receiving armature 180 two clock signals having different frequency.

Preferably (though not necessarily), the frequency of the clock signal applied to the second receiving armature 180 must be equal to twice the frequency of the clock signal applied to the first receiving armature 175, or vice versa.

Use of the frequency to transmit the indication of which receiving armature 175 or 180 is approached to the transmitting armature 165 assures greater immunity to interference compared to systems based on voltage-controlled signals (duty-cycle or amplitude modulation), but the signal management circuit 150 of each transmission set 135 must be different.

Figure 17:
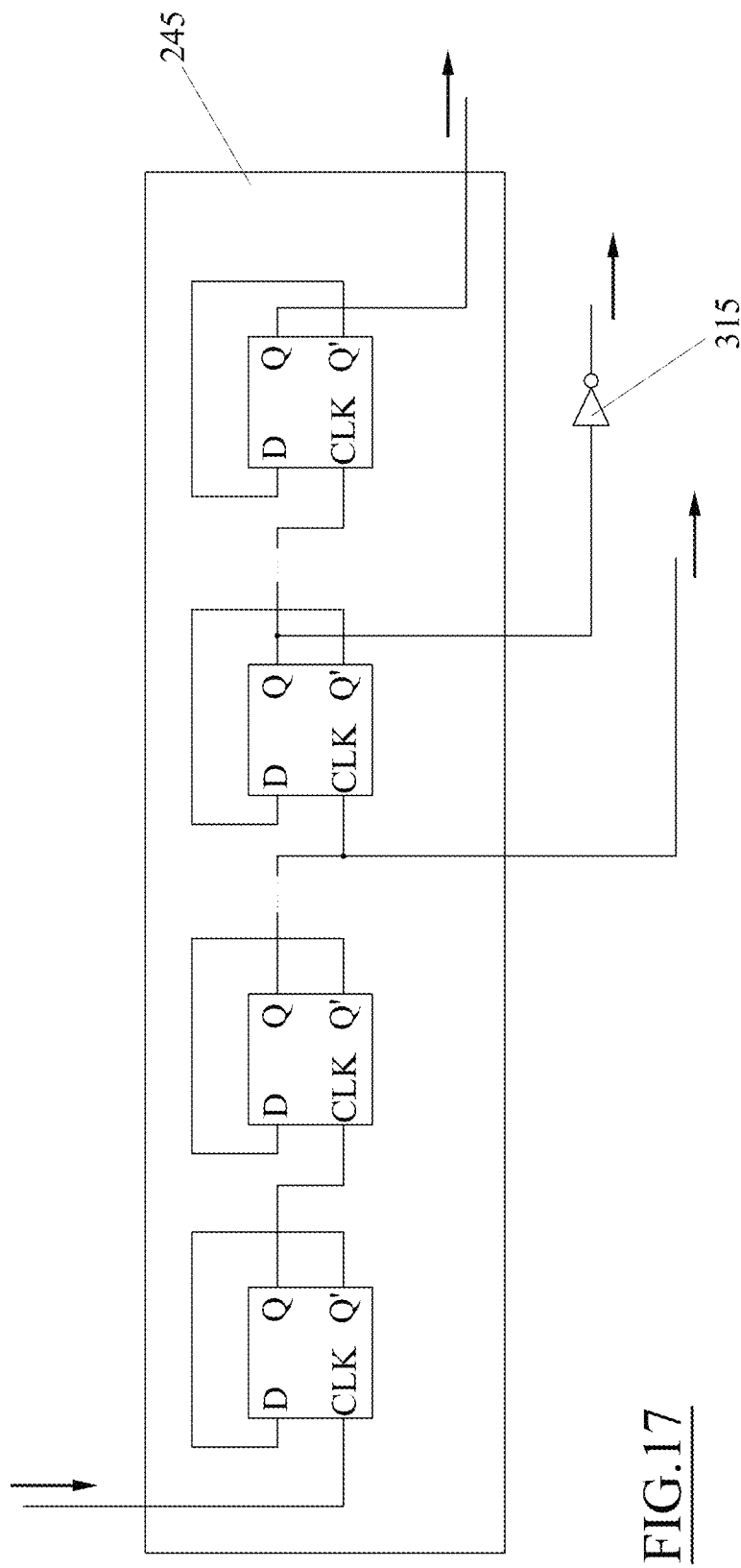

First of all, the frequency divider 245 will have to be configured to supply the "direct" driving signal and the "inverse-phase" driving signal to be sent to the selector 320, drawing them from two different stages as illustrated in FIG. 17. For example, considering the case in which the frequency of the clock signal applied to the second receiving armature 180 is twice as high as that of the clock signal applied to the first receiving armature 175, the "direct" driving signal will have to be drawn from the last stage of the frequency divider 245 while the "inverse-phase" driving signal will have to be obtained "inverting", e.g. with the NOT logic gate 315, the signal output by the penultimate stage of the frequency divider. In this way, both the "direct" and the "inverse-phase" driving signal will have the same frequency and may be used to drive the power circuit 155. Naturally, the connection would be the opposite if the frequency of the clock signal applied to the second receiving armature 180 were half of that of the clock signal applied to the first receiving armature 175.

Figure 18:
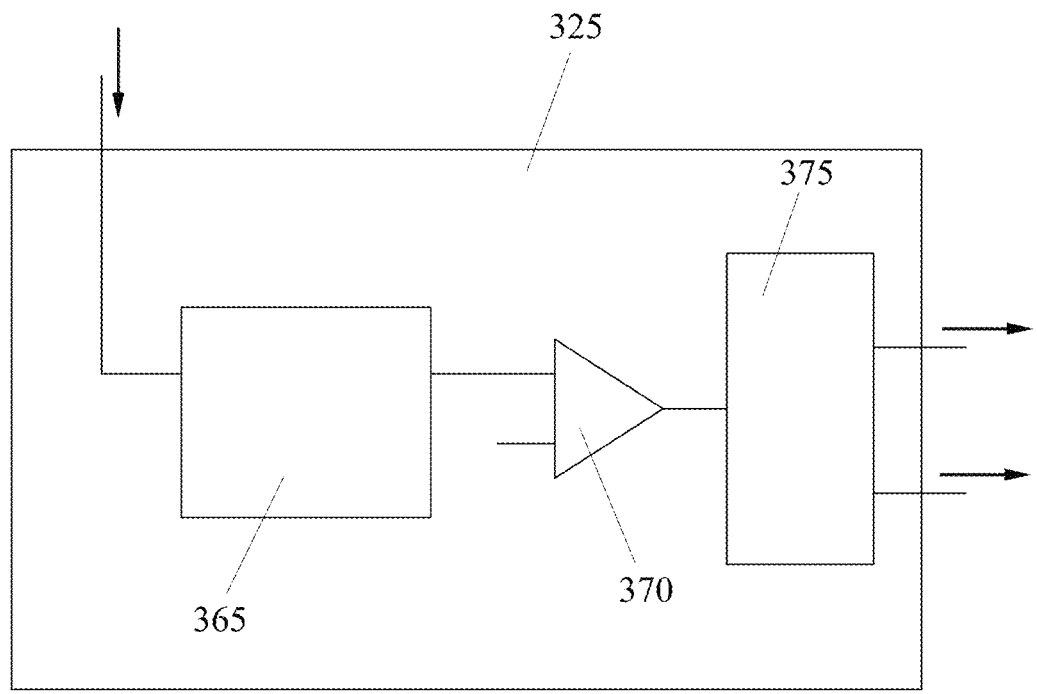

Concurrently, the control module 325 of the selector 320 can be modified as illustrated in FIG. 18 and comprise an integrator circuit 365 (e.g. a simple RC filter, or any active or passive integrator circuit), which receives at its input the clock signal coming from the transmitting armature 165.

Since the input wave is typically a square wave, its integrated signal output by the integrator circuit 365 is a triangular wave, whose peak value will be the higher, the lower the frequency of the input wave. In accordance with the previous example, if the captured clock signal is the low-frequency signal associated to the first receiving armature 175, the integrated signal will have a higher peak value than it would have if the captured clock signal were the high-frequency signal associated to the first receiving armature 175.

Naturally, the correspondence would be inverse if the frequency of the clock signal applied to the second receiving armature 180 were half that of the clock signal applied to the first receiving armature 175.

Exploiting this property, the output signal from the integrator circuit 365 can then be input to a comparator 370 that compares the peak voltage with a reference voltage. The output of the comparator 370 is then processed by a logic module 375, e.g. detecting for the higher-frequency wave no output input from the comparator 370 and a series of equidistant impulses for the lower-frequency wave. The logic module 375, typically but not necessarily with combinatory logic, generates the signals to drive the selector 320.

For example, if the peak value of the integrated signal is higher than the reference value, the selector 320 will be commanded to drive the power circuit 155 with the "direct" driving signal, i.e. having the same phase as the signal generated by the control circuit 125 positioned on the device to be powered 110, if instead the peak value of the integrated signal is lower than the reference value, the selector 320 will be commanded to drive the power circuit 155 with the "inverse-phase" driving signal. Naturally, the operation could also take place in the opposite way.

Lastly, if the peak value of the integrated signal is substantially zero (absence of clock signal), the selector 320 will not drive the power circuit 155 and the logic 375 will also bring the activation switch 225 to the open configuration, in order to connect the transmitting armature 165 to the electrical branch 230 and hence to the reference potential (e.g. to ground) in a manner similar to the previous circuits.

It should be pointed out herein that the integrator circuit 365 of the control module 325 can be configured to receive the clock signal directly from the output of the filter 240 or, more advantageously, from the output of an appropriate stage of the frequency divider 245, without thereby conceptually modifying the system.

The proposed system also functions using the divided signal because the information is given by the frequency difference between the signal indicating a receiving armature or another, not by duty-cycle or amplitude values that would be lost by the frequency division stages.

The advantage tied to the utilization of the signal that enters the integrator circuit 365 with already divided frequency consists fundamentally of being able to use slower comparators 370 than those necessary to process the original signal, and hence more economical. The greater the frequency division undergone by the signal before entering the integrator circuit 365, the slower the speed required for the comparator 370 utilized to compare the triangular wave to the reference voltage, significantly reducing its cost. To further reduce the cost of the control circuit, it is also possible to provide additional division stages after the outputs that go to the selector 320. An additional advantage is tied to the better quality of the output signal from one frequency division stage compared to the output signal from the filter.

A fourth strategy to understand whether the transmitting armature 165 faces the first receiving armature 175 or the second receiving armature 180 consists of providing each transmission set 135 with an independent sensor (e.g. based on magnetism, halt effect, electrical field, light, sound, RFID transmitter, NFC, antenna, or the like), active or passive, which is able to interact with one or more reference elements positioned on the device to be powered 110, in order to generate a position signal indicating the relative position of one or both of the receiving armatures 175 and 180. Each transmission set 135 can also comprise a logic module able to receive the position signal generated by the sensor, in order to understand whether the corresponding transmitting armature 165 is approached to the first receiving armature 175, to the second receiving armature 180 or to neither of them, to command the selector 320 accordingly, In this case, it is evident that the principle underlying the choice of the "direct" or "inverse-phase" driving signal is independent with respect to the clock signal transmitted by the control circuit 125. The latter signal thus serves in this case only to transmit a clock, and possibly to transmit user data independently.

The schemes proposed above, which enable to apply to the transmitting armatures 165 voltage waves that are offset in phase (typically with opposite phase) depending on whether they face they first or the second receiving armatures 175 and 180, have the advantage of making the power transmission more effective and to achieve numerous advantages from the standpoint of efficiency.

Figure 7:
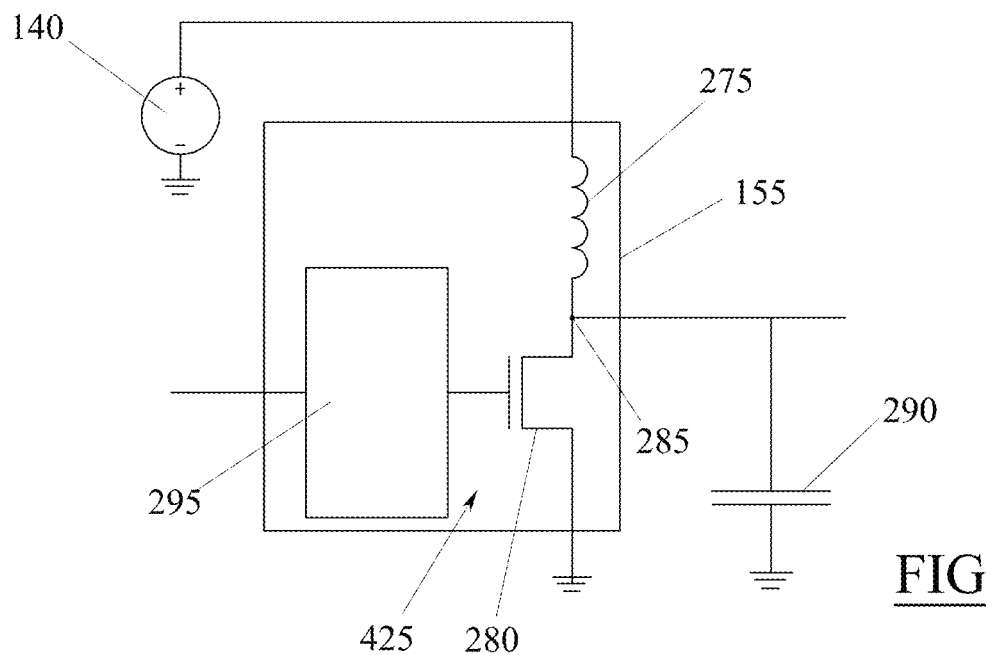

For example, it the switching circuits 250 use a scheme like the one of FIG. 7, it is possible to considerably reduce the dimensions of the choke inductance 275 of each switching circuit 250 with respect to what the literature states with regard to the dimensioning of resonating amplifiers, e.g. in class E or F.

While the choke inductance normally must be of sufficiently high value to constitute ideally a current generator, in the proposed switching circuit 250 the choke inductance 275 can be significantly under-dimensioned, even allowing inversions of the current sign.

Globally, the circuit as a whole constitutes a push-pull system, so that to each current inversion in a power supply branch of a device to be powered 110 corresponds a similar but inverse current inversion in the mirror branch (e.g. driving a plate facing the second receiving armature).

In this way the voltage generator 140 that powers the transmission circuit globally sees a circuit having substantially resistive behavior, hence with optimized power factor with no need for power factor correcting stages. This is a particularly significant advantage, not obvious in the presence of switching circuits, in particular if the required miniaturization is such as not to allow the use of input filter capacitors having high capacitance and large size. As shown in FIG. 19, the power supply device 105 can be modified to constitute also a very high speed communication channel between multiple devices to be powered 110.

In particular, the control circuit 125 of each device to be powered 110 can be provided with an encoder 395 able to apply to the receiving armatures 175 and/or 180 a signal that contains not only the clock signal but also the data coming from the device to be powered 110 (schematically indicated with an arrow in FIG. 19).

The encoder 395 can encode the data for example with encoding methods such as differential Manchester, biphase mark code (BMC), 8b/10b encoding, 64b/66b encoding, 64b/67b encoding or others. Particularly advantageous are the encoding methods that assure rigorously nil average value of voltage on the line.

Concurrently, the control module 325 of each transmission set 135 of the power supply device 105, in addition to processing the clock signal to drive the power circuit 155 as described above, can be provided with a decoder 400 able to decode the other data carried by the signal generated by the control circuit 125 of the device to be powered 110, which can then be addressed in a shared bus 410, e.g. a USB 3.0 bus or an HDMI bus.

Communication can clearly be made bidirectional introducing a second data encoder also on the power supply device 105, and a second decoder on the device to be powered 110.

To prevent excessive costs of the system, it is possible for only some transmission sets 135 of the power supply device 105 to be able to receive and/or transmit the data signal, so that most of the transmission sets 135 remains low-cost and capable only of managing power transmission. Since the data travel at very high frequency (tens of MHz, hundreds of MHz or even GHz), the capacitive coupling of a few transmitting armatures 165 (ideally only one) is sufficient to transmit the data signal, which can then be decoded and routed on an appropriate communication bus 410 which makes the data available to all the devices to be powered 110 positioned on the operating surface 160.

To prevent electromagnetic pollution, the communication bus 410 can have such shape and dimensions as to limit emissions (hence, it must be dimensioned to function as a very poor antenna) and can be differential, e.g. consisting of two superposed, close data planes, over which differential signals travel and to which are connected all the primary circuits provided with user data interface, and thus capable both of reading the data from the receiving armatures, sent by the controller positioned on the device to be powered 110, and to send data to the transmitting armatures, useful to be captured by the receiving armatures and decoded by the controller positioned on the device to be powered 110.

According to an aspect that is common to all embodiments described above, the transmitting armature 165 of each transmission set 135 could be divided into a plurality of transmitting armatures 165A connected to the same power circuit 155 and to the same signal management circuit 150, e.g. to reduce the cost per unit of surface area of the operating surface 160.

Figure 20:
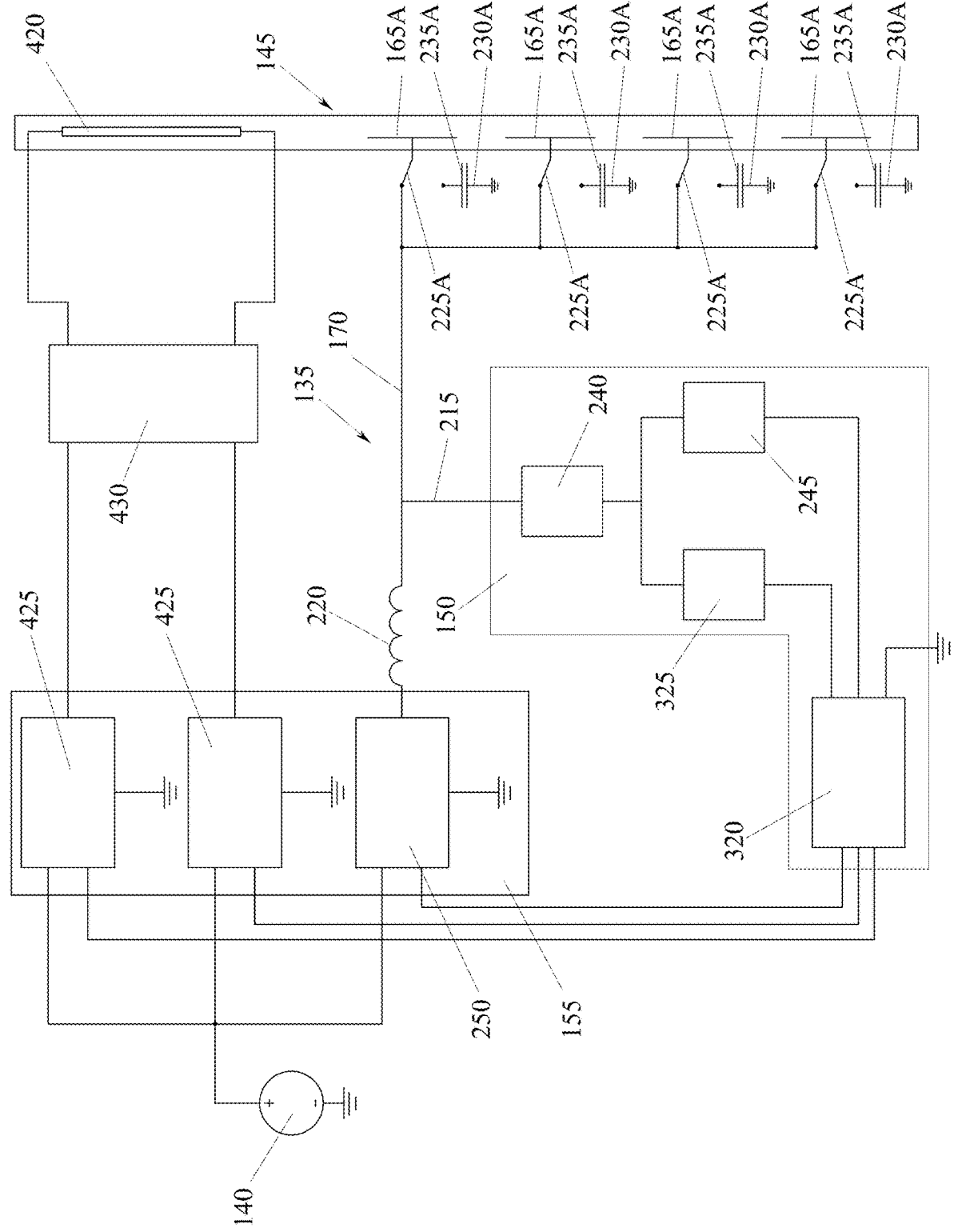

In this case, the circuit diagram of each transmission set 135 remains substantially unchanged, but each transmitting armature 165A can be connected to the electrical branch 170 by means of a respective activation switch 225A, as shown for example in FIG. 20.

Each activation switch 225A can be selectively switched between a closed configuration, in which it connects the respective transmitting armature 165A to an electrical branch 230A referred to ground or to another reference potential, and an open configuration, in which it connects the transmitting armature 165A to the electrical branch 170 that is connected to the related power circuit 155 and to the related signal management circuit 150.

An electrical capacitor 235A may be positioned on each electrical branch 230A, e.g. to create a ground connection between the data circuits positioned on the power supply device 105 and on the device to be powered and/or to control the impedance of the circuit and to create a dynamic impedance matching between the electrical load 115 and the voltage 140.

Every activation switch 225A can be controlled by the control circuit of the power supply device 105, that selects which transmitting armatures 165A to connect to the electrical branch 170 according to the signals received from the armatures of the device to be powered 110, using a similar logic to the one described above.

For example, the switches can normally be maintained in the closed position to be periodically brought to the open position one after the other in sequence, for example with the aid of a timer or of a counter. In this way it is possible to identify whether and which transmitting armatures 165A of the sub-set face the first receiving armature 175 of the device to be powered 110, subsequently going to apply the voltage wave only to the identified ones, while all the others can be maintained unpowered i.e. connected to the electrical branch 235A.

Naturally, if the driving signal for the power circuit 155 is generated by a signal generator positioned directly in the power supply device 105, the signal management circuit 150 and the various activation switches 225A could be absent.

Thanks to this solution, for equal global dimensions of the operating surface 160 of the power supply device 105, it is advantageously possible significantly to increase the number of transmitting armatures 165A reducing their dimensions, thereby obtaining a very precise capacitive coupling with the receiving armatures 175 and 180 of the device to be powered.

On the other hand, for an equal global number of transmitting armatures, it is advantageously possible to considerably reduce the number of signal management circuits 150 and of the power circuits 155, thereby reducing the total costs of the system 100.

Naturally, the transmitting armatures 165A can have any geometry, including irregular ones. However, regular geometries such as triangles, circles, rectangular, square or hexagons can be particularly simple and effective.

Figure 21:
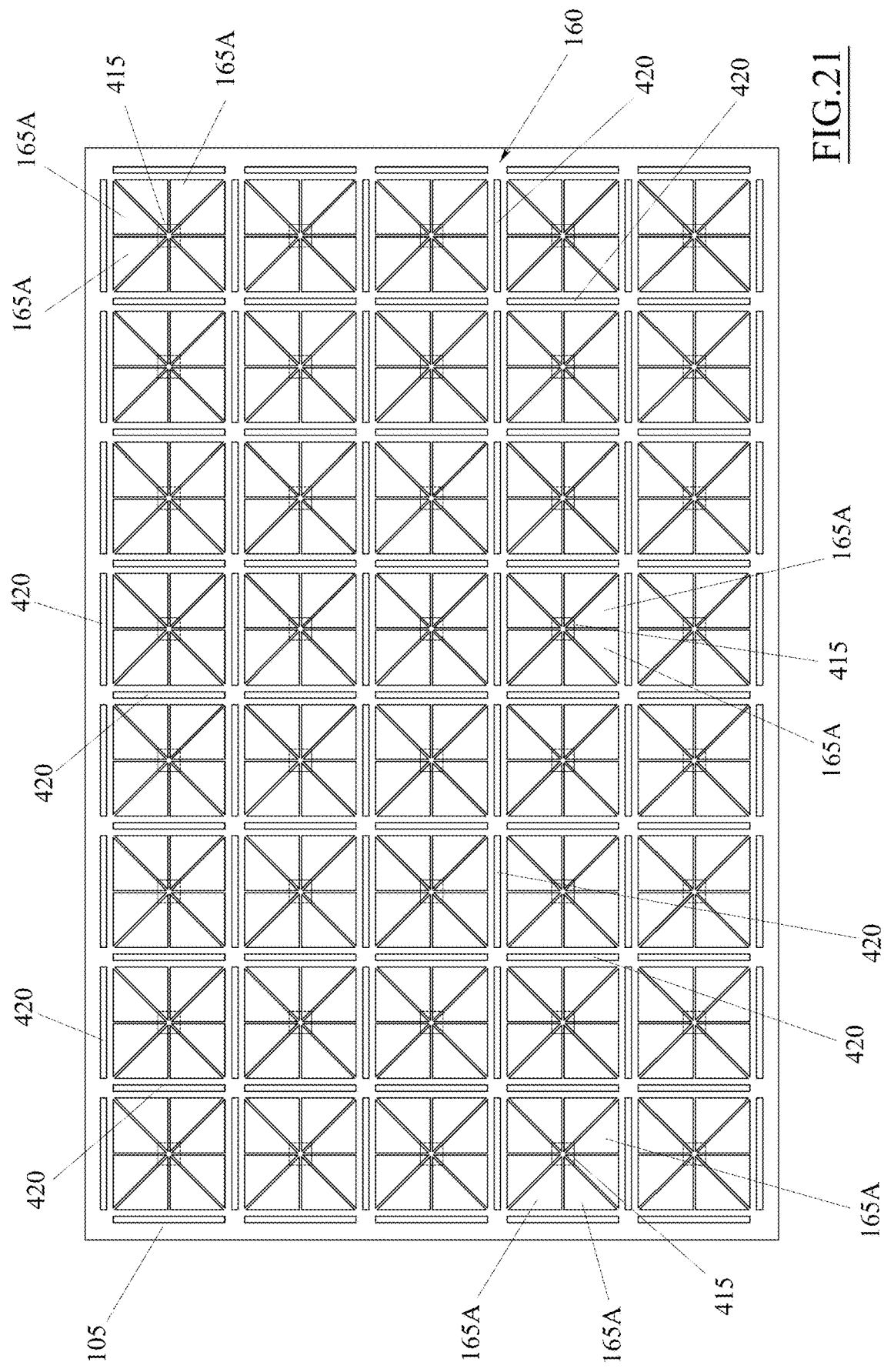

In particular, a particularly advantageous (though not exclusive) embodiment entails substantially replacing each of the transmitting armatures 165 illustrated in FIG. 9, with a group of transmitting armatures 165A having triangular shape but mutually arranged in such a way as to recreate the square/rectangular shape of the transmitting armature 165, e.g. as shown in FIG. 21 where each transmitting armature 165 is divided along the diagonals and the bisectors in a set of eight transmitting armatures 165A.

The signal management circuit 150 (if present) and the power circuit 155 connected to each set of transmitting armatures 165A and to the related transmitting inductive elements 420 can be embodied in the form of a chip 415 positioned at the center of the rectangle/square, thus being substantially equidistant from each transmitting armature 165A of the set and thus minimize problems tied to distributed parasitic reactance.

The triangular shape of the transmitting armatures 165A allows to better approximate the shape of the devices to be powered 110 (typically rectangular) which are positioned randomly on the operating surface 160, hence potentially misaligned with respect to the sides of a square. By virtue of the diagonals at 45 degrees it is more likely that a configuration of transmitting armatures 165A will be found that best approximates the receiving armatures 175 and 180. This conformation thus prevents parts of transmitting armatures 165 of FIG. 3 from being activated even though they are not completely covered by a receiving armature 175 or 180, reducing losses.

It should be observed that, in the embodiments described thus far, the outputs of the two rectifiers 130 and 440 power the electrical load 115 independently, assuring a substantially autonomous operation of the inductive reception part and of the capacitive reception part.

Figure 22:
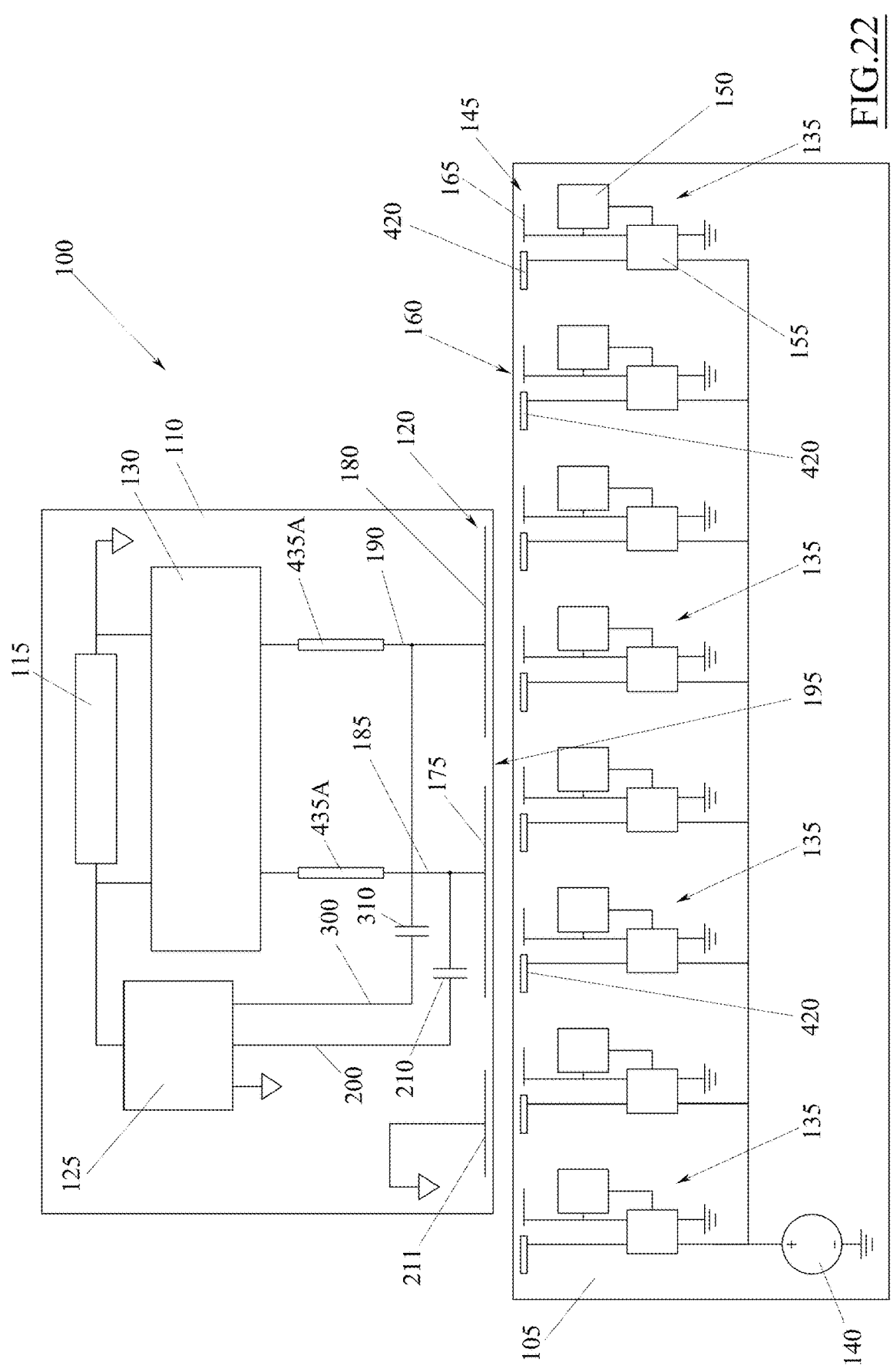

A particularly advantageous variant of the proposed circuit, however, is shown in FIG. 22. In this specific implementation, the device to be powered 110 comprises only the rectifier 130 on which both the inductive part and the capacitive part act synergistically.

This is obtained replacing the receiving inductive element 435 with two distinct receiving inductive elements 435A, one of which is inserted on the electrical branch 185 in series between the first receiving armature 175 and the rectifier 130 while the other one is inserted on the electrical branch 190 in series between the rectifier 130 and the second receiving armature 180.

Figure 23:
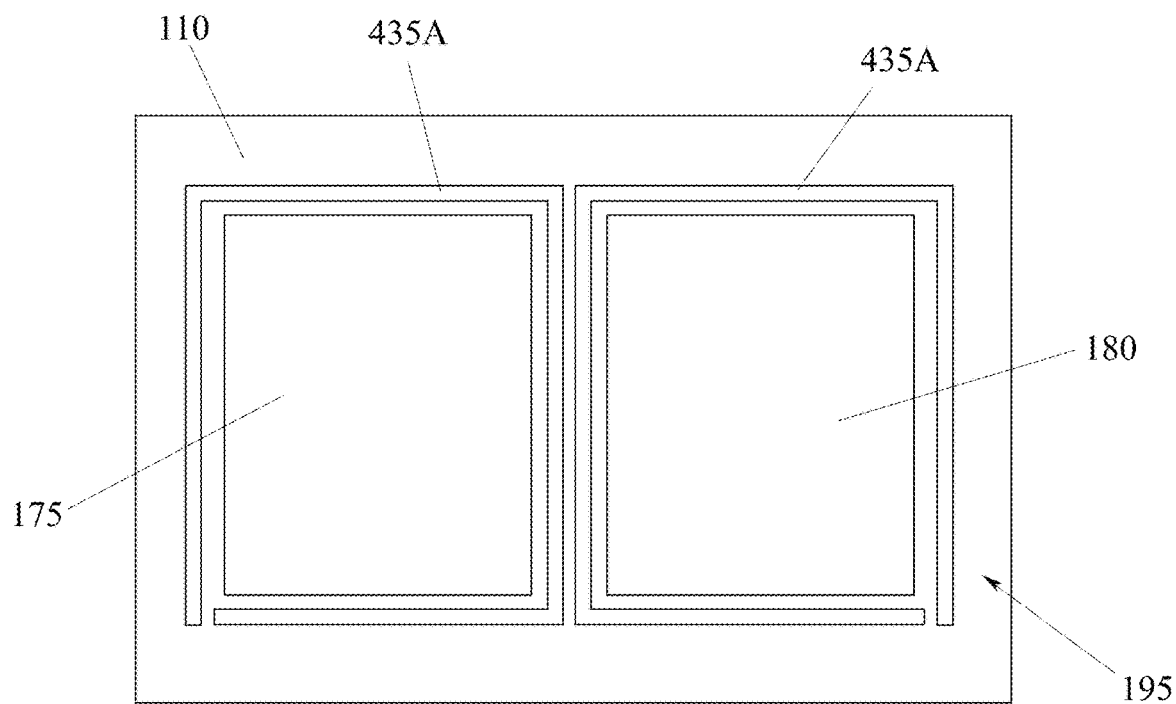

Each of these receiving inductive elements 435A can be shaped as a coil that extends, for example, coplanar respectively around the first receiving armature 175 and around the second receiving armature 180, as shown for example in FIG. 23.

In this way, the receiving inductive elements 435A serve multiple functions: series inductor useful to form the LC resonator of the power circuit, receiving inductive elements, useful to boost the power transmitted to the electrical load 115 adding to the power received capacitively the power received inductively, and low-pass fitters useful to prevent the signals injected by the control circuit from interacting with the load.

This implementation is particularly advantageous inasmuch as it minimizes the number of necessary components, the size and the costs connected with the device to be powered 110, while increasing the versatility of the system and the transmissible power.

To transfer electrical power by means of the inductive coupling between the receiving inductive elements 435A and each transmitting inductive element 420 connected thereto, the two switching circuits 425 positioned at the ends of the transmitting inductive element 420 can be driven in the same way described above.

However, the condition for the system to function correctly is that the voltage waves received from the receiving armatures 175 and 180 and the voltage waves induced by the magnetic coupling between transmitting inductive elements 420 and receiving inductive elements 435A must have adequate phases and impedance.

In particular, since the receiving inductive elements 435A and the receiving armatures 175 and 180 are all connected to the same rectifier 130, the excitation voltage of the transmitting inductive elements 420 must be selected in such a way as to assure a synergistic operation of the waves induced on the receiving inductive elements 435A and on the receiving armatures 175.

In this case, too, the driving signal for the power circuits 155 of the transmission sets 135 can be generated by a signal generator positioned directly on the power supply device 105, or through the clock signal generated by the control circuit 125 positioned on the device to be powered 110 and captured through the signal management circuits 150.

In this latter case, the selective activation of the transmission sets 135 can be controlled with an appropriate control of the activation switches 225 as explained above.

Alternatively to this method, a synergistic data exchange can be accomplished on both the inductive and capacitive branches, wherein the inductive branch allows the transmission by the control circuit 125 positioned on the device to be powered 110 of a simple initial handshake to the control circuit 125 positioned on the transmission set 135, because typically the branch based on inductive coupling has a low-pass or band-pass characteristic with band center at relatively low frequencies (those of the power transmission). Once the handshake is received through inductive circuit, the control module 322 can open the activation switch 225 which connects the transmitting armature 165 to the signal management circuit 150, thus enabling data reception at very high frequency and hence high bitrate on the capacitive channel. In some cases, it may be advantageous to use the capacitive coupling exclusively for a data stream, leaving the transfer of power to the inductive coupling.

Figure 24:
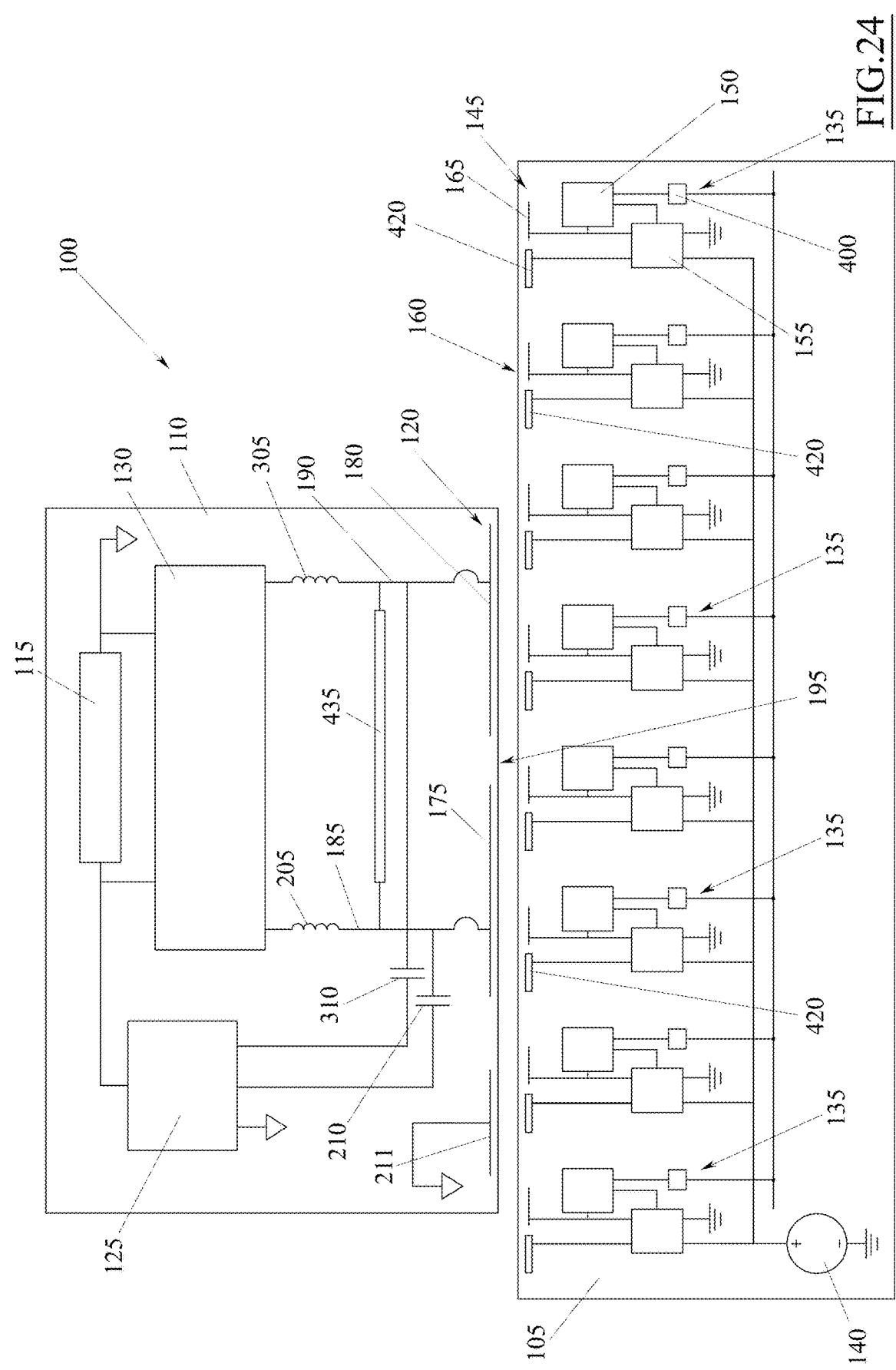

FIG. 24 shows another variant that enables the device to be powered 110 to comprise only the rectifier 130 on which both the inductive and the capacitive part act synergistically.

In this additional variant, the receiving inductive element 435 is connected in parallel to the receiving armatures 175 and 180, e.g. connecting a first end of the inductive element 435 to the electrical branch 185 that connects the rectifier 130 to the first receiving armature 175, and the second end of the inductive element 435 to the electrical branch 190 that connects the rectifier 130 to the second receiving armature 180.

In this case, it may be advantageous also to insert the series inductors 205 and 305 useful to prevent the data exchange system 125 from interacting with the load 115, in which the inductor 205 can be inserted on the electrical branch 185 between the rectifier 130 and the connecting node with the receiving inductive element 435 while the inductor 305 can be inserted on the electrical branch 190 between the rectifier 130 and the connecting node with the receiving inductive element 435.

It should also be specified that some embodiments could provide a hybrid solution between those illustrated in FIGS. 22 and 24, i.e. in which the device to be powered 110 comprises both the series inductive elements 435A illustrated in FIG. 22 and the parallel inductive element 435 illustrated in FIG. 24.

Figure 25:
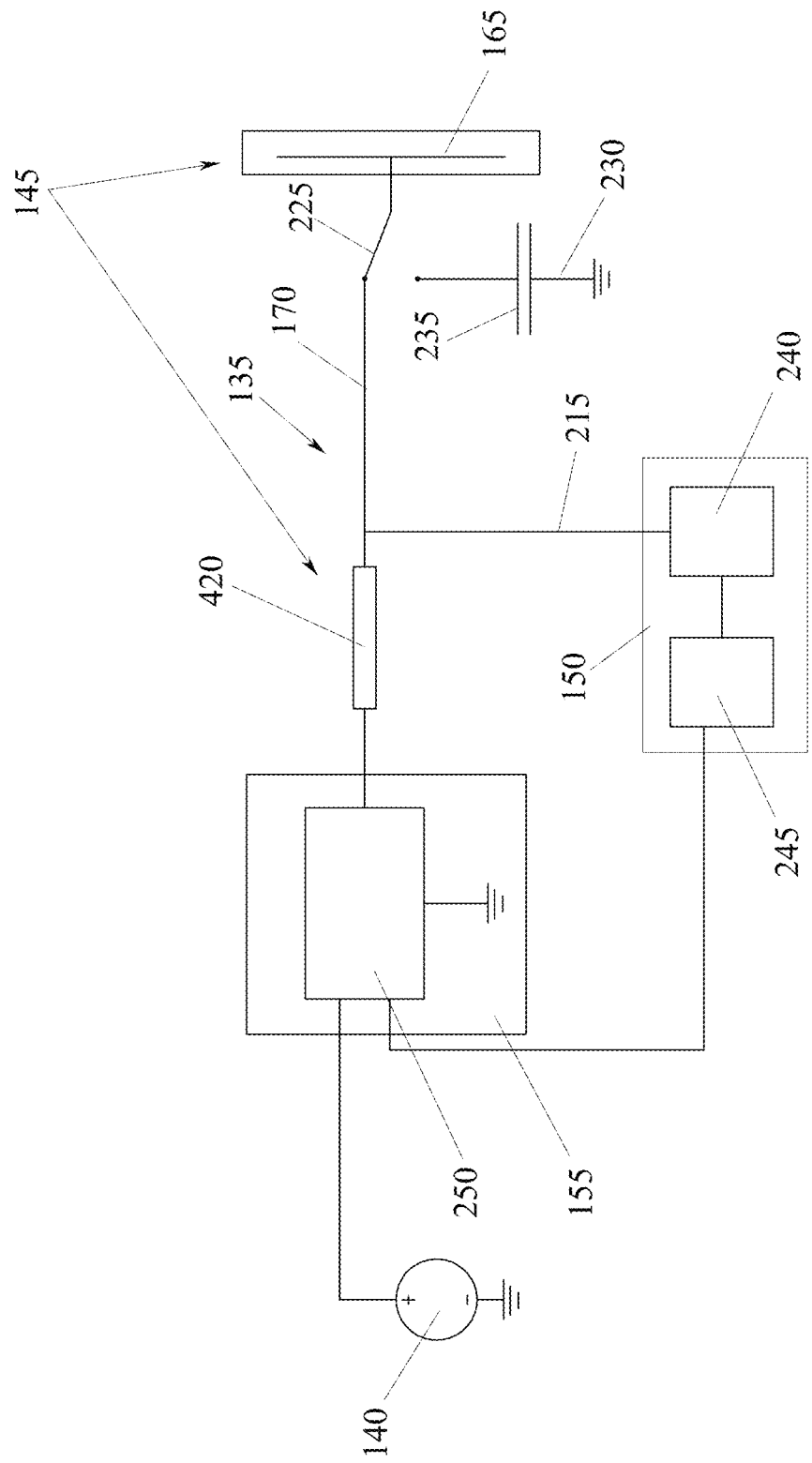

According to a variant applicable to all embodiments described above, or at least to all those that entail the possibility of obtaining a hybrid inductive/capacitive coupling, each transmission set 135 can be embodied as indicated in FIG. 25.

With respect to the embodiment illustrated in FIG. 8 et seq., in this embodiment the transmitting inductive element 420 is positioned on the electrical branch 170, in series between the related switching circuit 250 and the related transmitting armature 165.

In practice, this embodiment entails replacing the inductor 220 already provided in the embodiments of FIG. 8 et seq. directly with the inductive element 420.

Naturally this latter embodiment of the transmission sets 135 can be utilized independently of the fact that the clock signal that controls the switching circuit 250 is generated directly by the power supply device 105 or by the device to be powered 110, as explained in the above description.

Figure 26:
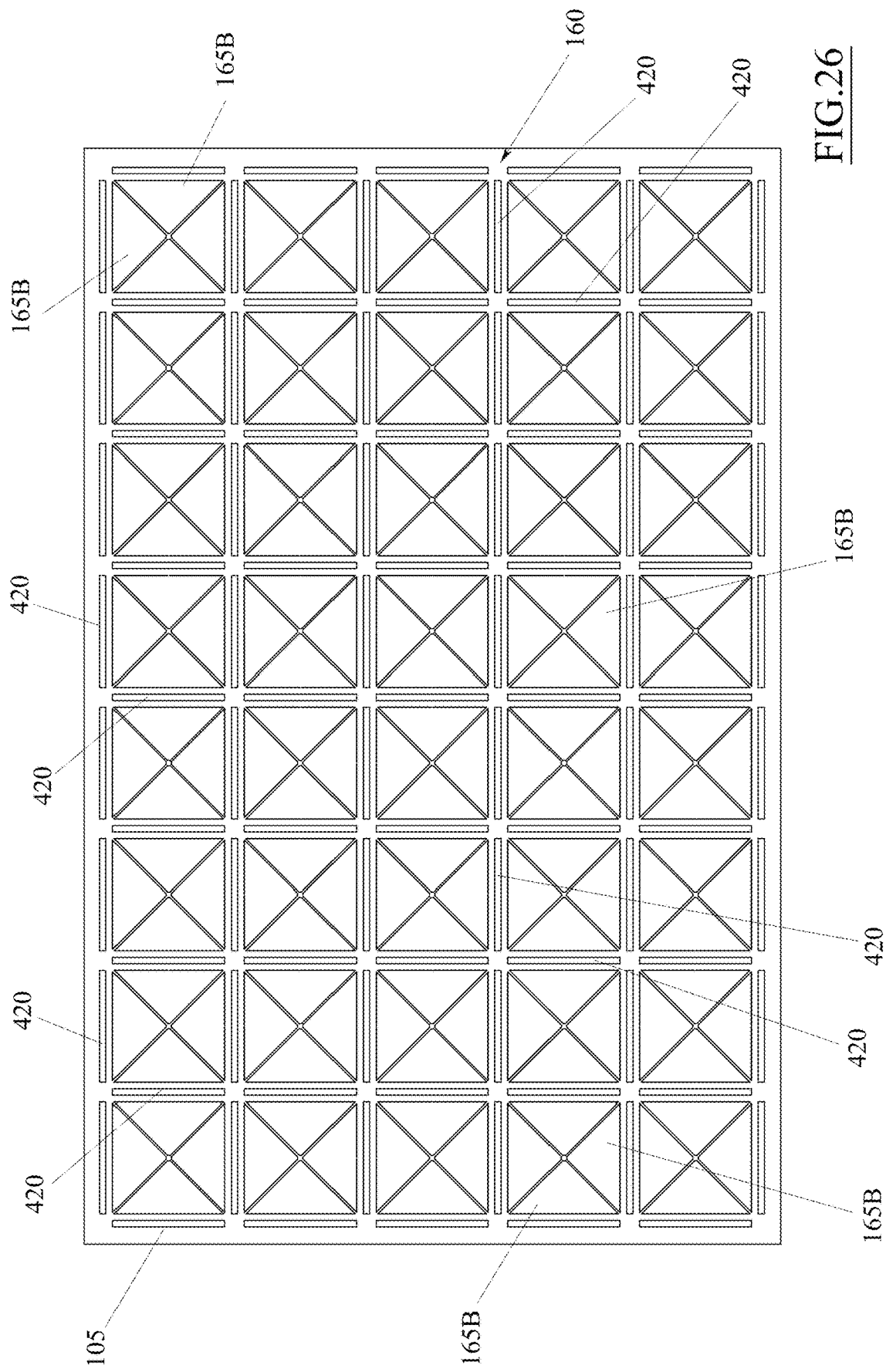

Exploiting the circuit solution of FIG. 25, in a preferred embodiment of the system 100, lastly, each of the transmitting armatures 165 illustrated in FIG. 9 can be replaced by a set of transmitting armatures 1658, e.g. a set of four transmitting armatures 1658 for example with substantially triangular shape as shown in FIG. 26, where each transmitting armature 1658 is associated to a respective transmitting inductive element 420, e.g. to the one adjacent thereto, to define therewith the transmitting apparatus 145 of a single transmission set 135.

Naturally, this division of the transmitting armatures 165 could also be adopted if the transmission sets were in accordance with the embodiment of FIG. 8 et seq.

It should be noted that the embodiments that use transmission sets 135 with transmitting apparatuses 145 of the hybrid capacitive/inductive type allow great utilization versatility, In particular, with a single power supply device 105 it is possible to create multiple recharging couplings with a multiplicity of different devices to be powered 110, positioned at different distances, based on different reception principles, e.g. capacitive, inductive, resonating magnetic, RF, etcetera, on different and independent operating frequencies, also by virtue of the possibility of inserting an appropriate passive or active matching network on secondary circuit and/or on a circuit of the power supply device 105.

For example, if the distance between the power supply device 105 and the device to be powered 110 is very small (e.g. laptop or cellular telephone bearing directly on the operating surface 160 of the power supply device 105), the system can advantageously and preferably exploit the capacity coupling and possibly exploit the inductive coupling only as an additional power contribution.

Vice versa on greater distances the inductive coupling may be advantageous, and as distance increases it may be useful to reconfigure the system dynamically to operate by means of resonating magnetic coupling and, at even greater distances, to serve as a radiating transmission antenna, coupled to one or more receiving antennas, This allows to achieve the transfer of power not only for any position of the device to be powered 110 on the operating surface 160, but also for various distances in the orthogonal/vertical direction (from a few centimeters to a few meters), changing, also dynamically, the type of preferential coupling between capacitive, inductive, resonating magnetic and/or based on antennas.

It should also be stressed that the transmitting elements, both inductive and capacitive, in particular at a large distance, can be exploited as a multitude of antennas driven at high frequencies, e.g. RF, such as to generate in space constructive and destructive interferences useful for example to reach target antennas with particularly precise directional beams.

It should also be stressed that the control systems of the transmission sets 135 are able to activate only the transmitting armatures 165 and the transmitting inductive elements 420 that are located in proximity to the receiving armatures 175 and 180 and to the receiving inductor 435/435A, very effectively approximating the shape of the device to be powered 110.

It should also be stressed that the presence of transmission sets 135 having hybrid capacitive/inductive transmitting apparatuses 145 can also be compatible with devices to be powered 110 having only inductive or only capacitive receiving apparatuses, and that according to the dimensions and the number of transmitters and receivers it is possible to make the operating frequency of the system to vary from hundreds of kHz to GHz.

The proposed system is thus particular suitable for the wireless transmission of high power and signals at high speed by means of an operating surface 160 based on capacitive, inductive, antenna-based or hybrid coupling. The operating surface 160 can comprise a matrix of transmitting apparatuses 145 consisting of transmitting armatures 165 and transmitting inductive elements 420 which are commanded by appropriate power circuits 155 and signal management circuits 150. When to the operating surface 160 are approached devices to be powered 110, e.g. smartphones, laptops, displays, computers and television sets, the receiving armatures 175 and 180 inserted in the device to be powered 110, typically of larger size than the transmitting armatures 165, determine capacitances therewith, through which power and data can be transmitted even simultaneously. Simultaneously, inductive couplings can also be created between the corresponding receiving inductive elements 435/435A and transmitting inductive elements 420, advantageously with respect to the prior art in order to create, also for inductive transmission, a transmission circuit that can be reconfigured dynamically according to the shape and to the impedance of the receiving inductive circuit.

It is particularly important to stress that, to further reduce the industrialization cost, any embodiment of the power supply device 105 described above can be obtained using thin-film transistor (TF) techniques like the ones successfully exploited in the world of LCD displays. Through these techniques, it is possible to draw the active components, and in particular the power switch useful to drive each armature. e.g. N-channel mosfet, directly on the substrate, considerably reducing the cost of the system.

Similarly, it possible to draw the passive components (in particular inductors and capacitors) directly in the conductive layers constituting the film. In this way, the power supply device 105 becomes a sort of pad or thin film that is very simple to power, able to be cut, flexible and commanded by extremely economical integrated circuits, inasmuch as all power circuitry (switches and passive elements) and most of the signal circuitry (in particular, but not exclusively, passive elements and filter) are drawn substantially at zero cost on the conductive layers.

This pad or thin film can thus easily be inserted in furniture and furnishings such as tables, walls, desks, furniture items or floors, and allows, in an economic and efficient manner, to wirelessly power and interconnect devices such as displays, television sets, computers, laptop, smartphones, tablets, wearable, home appliances, and any other electrical and electronic device.

Obviously, a person having ordinary skill in the art may make numerous technical/applicative modifications to the invention described above, without thereby departing from the scope of the invention as claimed below.

The invention claimed is:

1. A system for the wireless transfer of electrical power to an electrical load comprising:
    a power supply device, and
    a device to be powered, physically separate and independent from the power supply device,
    wherein the device to be powered comprises:
        the electrical load to be powered, and
        a receiving apparatus connected to the electrical load and comprising at least one receiving inductive element,
    wherein the power supply device comprises a plurality of electrical power transmission sets, each of which includes:
        a transmitting apparatus comprising at least one transmitting inductive element able to achieve an inductive coupling with the at least one receiving inductive element, and
        a power circuit adapted to apply to the transmitting apparatus a voltage wave that is periodically variable over time,
    wherein the transmitting inductive elements of the transmission sets individually have a planar conformation and are globally positioned side by side on an operating surface of the power supply device in such a way as to form a grid, and the transmitting inductive elements individually have an elongated shape, rectilinear development along a prevalent direction and are globally aligned by longitudinal rows and by transverse rows, where the transverse rows cross the longitudinal rows to define the grid,
    wherein each transmitting inductive element consists of a rectilinear wire segment or of a solid rectangular strip of electrically conductive material,
    wherein the prevalent direction of each transmitting inductive element is the long side of the solid rectangular strip or of the rectilinear wire segment,
    wherein each transversal row comprises a plurality of transmitting inductive elements that are aligned to one another along their prevalent direction,
    wherein each longitudinal row comprises a plurality of transmitting inductive elements that are aligned to one another along their prevalent direction, and
    wherein the prevalent direction of each transmitting inductive element of each longitudinal row is perpendicular to the prevalent direction of each transmitting inductive element of each transversal row.

2. The system according to claim 1, wherein the operating surface of the power supply device is a flat or curved surface.

3. The system according to claim 1, wherein the transmitting apparatus of each transmission set of the power supply device further comprises:
    at least one transmitting armature connected to the corresponding power circuit and positioned on the operating surface of the power supply device within a mesh of the grid of transmitting inductive elements, and
    wherein the receiving apparatus of the device to be powered further comprises:
        a first receiving armature connected to the electrical load and adapted to face the transmitting armature of a first transmission set to achieve a first electrical capacity of a capacitive connection,
        a second receiving armature connected to the electrical load and adapted to face the transmitting armature of a second transmission set to obtain a second electrical capacity of the capacitive connection.

4. The system according to claim 3, wherein the transmitting apparatus of each transmission set of the power supply device comprises a plurality of transmitting armatures connected to the corresponding power circuit and positioned within the same mesh of the grid of transmitting inductive elements.

5. The system according to claim 3, wherein the receiving apparatus of the device to be powered comprises two receiving inductive elements able to achieve an inductive coupling with one or more transmitting inductive elements of the power supply device, of which a first receiving inductive element connected in series between the first receiving armature and the electrical load and a second transmitting inductive element connected in series between the second receiving armature and the electrical load.

6. The system according to claim 1, wherein the power circuit of each transmission set comprises at least one switching circuit adapted to receive a driving signal and to connect the transmitting apparatus to a voltage generator in an intermittent and periodic manner, with a frequency equal to the frequency of the driving signal.

7. The system according to claim 6, wherein the switching circuit comprises a pair of electrical switches connected in series between the voltage generator and a reference potential, between said switches being comprised a central node connected to the transmitting apparatus.

8. The system according to claim 6, wherein the switching circuit comprises an inductor and a switch connected in series between the voltage generator and a reference potential, between said inductor and said switch being comprised a central node connected to the transmitting apparatus.

9. The system according to claim 1, wherein each transmission set further comprises:
    a monitoring system adapted to detect a relative position between each transmission set and the device to be powered,
    a selection system adapted to select, based on the detection made by the monitoring system, an array of transmission sets whose transmitting apparatus is in suitable position to achieve the inductive coupling with the receiving apparatus of the power supply device, and a control system adapted to activate the power circuit of the transmission sets belonging to the selected array.

* * * * *